US008022987B2

United States Patent
Ko et al.

(10) Patent No.: US 8,022,987 B2
(45) Date of Patent: Sep. 20, 2011

(54) INFORMATION-BASED SELF-ORGANIZATION OF SENSOR NODES OF A SENSOR NETWORK

(75) Inventors: Teresa H. Ko, Castro Valley, CA (US); Nina M. Berry, Tracy, CA (US)

(73) Assignee: Sandia Corporation, Livermore, CA (US)

( * ) Notice: Subject to any disclaimer, the term of this patent is extended or adjusted under 35 U.S.C. 154(b) by 1486 days.

(21) Appl. No.: 11/474,615

(22) Filed: Jun. 26, 2006

(65) Prior Publication Data

US 2007/0003146 A1  Jan. 4, 2007

Related U.S. Application Data

(60) Provisional application No. 60/695,304, filed on Jun. 30, 2005.

(51) Int. Cl.
*H04N 7/18* (2006.01)
(52) U.S. Cl. ........ 348/143; 348/152; 348/153; 348/155; 348/159
(58) Field of Classification Search ........... 348/140–180
See application file for complete search history.

(56) References Cited

OTHER PUBLICATIONS

R. R. Brooks et al, "Distributed Target Classification and Tracking in Sensor Networks", *Proceedings of the IEEE*, vol. 91, No. 8, Aug. 2003, pp. 1163-1171.
Q. Cai et al, "Tracking Human Motion in Structured Environments Using a Distributed-Camera System", *IEEE Transactions on Pattern Analysis and Machine Intelligence*, vol. 21, No. 12, Nov. 1999, pp. 1241-1247.

N. Berry et al, "Wireless Sensor Systems for Sense/Decide/Act/Communicate", *Sandia Technical Report SAND2003-8803*, Sandia National Laboratories, Livermore, CA, Dec. 2003, pp. 1-156.
J-Y. Bouguet et al, "Visual Navigation Using a Single Camera", *IEEE Proceedings, Fifth International Conference on Computer Vision*, Jun. 20-23, 1995, pp. 645-652.
A. Arora et al, "A Line in the Sand: A Wireless Sensor Network for Target Detection, Classification, and Tracking", Technical Report No. OSU-CISRC-12/03-TR71, Ohio State University, Columbus, OH, 2003, pp. 1-27.
R. R. Brooks et al, "Self-Organized-Distributed Sensor Network Entity Tracking", *The International Journal of High Performance Computing Applications*, vol. 16, No. 3, Fall 2002, pp. 207-219.
M. Pollefeys et al, "Automated reconstruction of 3D scenes from sequences of images", *ISPRS Journal of Photogrammetry & Remote Sensing*, vol. 55, Issue 4, Nov. 2000, pp. 251-267.
M. Chu et al, "Distributed Attention in Large Scale Video Sensor Networks", *Intelligent Distributed Surveillance Systems*, Feb. 2004, 3 pgs.
T. Darrell et al, "Plan-view trajectory estimation with dense stereo background models", *Proceedings of the Eighth IEEE International Conference on Computer Vision*, ICCV 2001, vol. 2, Jul. 7-14, 2001, pp. 628-635.
B. K. P. Horn et al, "Closed-form solution of absolute orientation using orthonormal matrices", *Journal of the Optical Society of America*, vol. 5, No. 7, Jul. 1988, pp. 1127-1135.

(Continued)

*Primary Examiner* — Andy Rao
(74) *Attorney, Agent, or Firm* — Michaelson & Associates; Peter L. Michaelson; George Wolken, Jr.

(57) ABSTRACT

A sensor node detects a plurality of information-based events. The sensor node determines whether at least one other sensor node is an information neighbor of the sensor node based on at least a portion of the plurality of information-based events. The information neighbor has an overlapping field of view with the sensor node. The sensor node sends at least one communication to the at least one other sensor node that is an information neighbor of the sensor node in response to at least one information-based event of the plurality of information-based events.

13 Claims, 16 Drawing Sheets

OTHER PUBLICATIONS

M. Isard et al, "Condensation-Conditional Density Propagation for Visual Tracking", *International Journal of Computer Vision*, vol. 29, No. 1, 1998, pp. 5-28.

S. Gordon et al, "Applying the Information Bottleneck Principle to Unsupervised Clustering of Discrete and Continuous Image Representations", *Proceedings of the Ninth IEEE International Conference on Computer Vision*, ICCV 2003, vol. 1, pp. 370-377.

C. Intanagonwiwat et al, "Directed Diffusion: A Scalable and Robust Communication Paradigm for Sensor Networks", *MobiCom'00: Proceedings of the 6th Annual International Conference on Mobile Computing and Networking*, Boston, MA, 2000, pp. 56-67.

R. A. Jacobs et al, "Adaptive Mixtures of Local Experts", *Neural Computation*, vol. 3, 1991, pp. 79-87.

S. Khan et al, "Tracking in Uncalibrated Cameras with Overlapping Field of View", *Performance Evaluation of Tracking and Surveillance (PETS) with CVPR*, 2001, 4 pgs.

J. Liu et al, "Distributed State Representation for Tracking Problems in Sensor Networks", *Information Processing in Sensor Networks, Proceedings in the 3rd International Symposium on Information Processing in Sensor Networks*, Berkeley, CA, Apr. 26-27, 2004, pp. 234-242.

W. M. Merrill et al, "Collaborative Networking Requirements for Unattended Ground Sensor Systems", *IEEE*, 2002, ISBN: 0-7803-7651-X, pp. 1-13.

J. Liu et al, "State-Centric Programming for Sensor-Actuator Network Systems", *IEEE Pervasive Computing: Mobile and Ubiquitous Systems*, vol. 2, No. 4, Oct.-Dec. 2003, pp. 50-62.

T. J. Olson et al, "Moving Object Detection and Event Recognition Algorithms for Smart Cameras", *Image Understanding Workshop*, DARPA Proceedings, New Orleans, LA, vol. 1, May 11-14, 1997, cover page and pp. 159-175.

C. S. Raghavendra et al, "Analysis of Wireless Sensor Networks for Habitat Monitoring", *Wireless Sensor Networks*, (© 2004, Kluwer Academic Publishers, Boston, MA), cover page and pp. 399-423.

A. Rahimi et al, "Sparse Sensor Networks", *MIT Project Oxygen: Student Oxygen Workshop*, 2003, 2 pgs.

K. Sohrabi et al, "Protocols for Self-Organization of a Wireless Sensor Network", *IEEE Personal Communications*, vol. 7, Issue 5, Oct. 2000, pp. 16-27.

K. Sohrabi et al, "Performance of a Novel Self-Organization Protocol for Wireless Ad-Hoc Sensor Networks", *IEEE Vehicular Technology Conference*, VTC'99, vol. 2, Sep. 19-22, 1999, pp. 1222-1226.

N. Berry et al, "Wireless Intelligent Monitoring and Analysis Systems", *Proceedings of SPIE Defense and Security Symposium: Multisensor, Multisource, Information Fusion: Architectures, Algorithms, and Applications*, vol. 5434, 2004, pp. 400-410.

T. Ko et al, "A Minimalistic Approach to Image Processing for Low-Power Sensor Networks", *Proceedings of SPIE Defense and Security Symposium: Visual Information Processing*, vol. 5438, 2004, pp. 51-62.

C. Stauffer et al, "Adaptive background mixture models for real-time tracking", *Proceedings of CVPR*, 1999, 4 pgs.

R. Kyker et al, "Hybrid Emergency Radiation Detection, a Wireless Sensor Network Application for Consequence Management of a Radiological Release", *Proceedings of SPIE Defense and Security Symposium: Digital Wireless Communications VI*, vol. 5440, 2004, pp. 293-304.

D. B. Yang et al, "Counting People in Crowds with a Real-Time Network of Simple Image Sensors", *Proceedings of the Ninth IEEE International Conference on Computer Vision* (ICCV'03), 2003, vol. 1, pp. 1-8.

A. Elgammal et al, "Non-parametric Model for Background Subtraction", *Computer Vision ECCV 2000: 6th European Conference on Computer Vision*, Dublin, Ireland, Jun. 26-Jul. 1, 2000, cover page and pp. 751-767.

A. Rowe et al, "A Low Cost Embedded Color Vision System", *IEEE RSJ International Conference on Intelligent Robots and Systems*, vol. 1, Oct. 2002, cover page and pp. 208-213.

B. Horling et al, "Distributed Sensor Network for Real Time Tracking", *Proceedings of the 5th International Conference on Autonomous Agents*, 2001, cover page and pp. 417-424.

F. Zhao et al, "Collaborative Signal and Information Processing: An Information-Directed Approach", *Proceedings of the IEEE*, vol. 91, No. 8, Aug. 2003, pp. 1199-1209.

INFORMATION-BASED SELF-ORGANIZATION OF SENSOR NODES OF A SENSOR NETWORK

CROSS-REFERENCE TO RELATED APPLICATION

This patent application claims priority to U.S. Provisional Patent Application Ser. No. 60/695,304 filed on Jun. 30, 2005, and is incorporated herein by reference in its entirety.

STATEMENT REGARDING FEDERALLY SPONSORED RESEARCH OR DEVELOPMENT

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing on this invention to license others on reasonable terms.

BACKGROUND OF THE INVENTION

1. Field of the Invention

The present invention relates to a system and method for information-based self-organization of sensor nodes of a sensor network.

2. Description of the Related Art

Securing our borders as well as our facilities and community events are critical when the infiltration of a single individual can result in mass casualties. Individuals are armed now with unconventional weapons where the attack can follow closely behind the detection of the individual. The depth and accuracy of typical current surveillance systems are insufficient for these types of attack.

Wireless sensor networks are often touted as the future solution to these surveillance problems. The low cost of sensor nodes enables coverage of greater areas and redundancy for border and facility surveillance. The small form factor, wireless communication, and battery power enable a quickly adjustable and easily deployed system for time-dependent events. Concerns over limited bandwidth and processing have directed much research towards reducing its form factor and power use. Less byte intensive sensors such as acoustic, magnetic and seismic are pervasive in this community. Because of the low byte size of the information gathered by these types of sensors, it is feasible to transmit the information from these sensors back to a centralized base station for processing. Work in both wireless sensor networks and computer vision typically follows the conventional architecture of transferring data to a centralized base station for processing. When dealing with small amounts of information at controlled intervals, sending that information to the centralized based station data poll is feasible on the limited available bandwidth.

Conventional wireless sensor node platforms are typically limited by the inability to readily incorporate images and computer vision techniques where the relevant orthogonal information for surveillance resides. In addition, sending raw data from images to a centralized base station for processing could quickly overload the wireless communication. Therefore, there is a need for wireless sensor nodes which can process raw image data and communicate information regarding the images.

Research in communication has often focused on maintaining connectivity and maximizing bandwidth through the wireless channel between sensor nodes based on the cost in terms of power consumption of transmission and reception. However, using a conventional technique, a sensor node may send information about an event that cannot be used by a receiving sensor node. Therefore, power may be wasted by the sending and the receiving sensor nodes. Therefore, there is a need for an improved technique to establish communication links among sensor nodes that reduces communication. This technique should work with wireless sensor nodes.

SUMMARY OF THE INVENTION

Accordingly and advantageously the present invention provides a sensor node and method of operating a sensor node. In various embodiments, a sensor node detects a plurality of information-based events. The sensor node determines whether at least one other sensor node is an information neighbor of the sensor node based on at least a portion of the plurality of information-based events. The information neighbor has an overlapping field of view with the sensor node. The sensor node sends at least one communication to the at least one other sensor node that is an information neighbor of the sensor node in response to at least one information-based event of the plurality of information-based events.

In some embodiments, a sensor node comprises at least one processor and at least one memory. The memory stored instructions executable by the at least one processor. The at least one memory comprises one or more instructions that detect an information-based event based on an image; one or more instructions that determine whether at least one other sensor node is an information neighbor of the sensor node based on the information-based event, wherein the information neighbor has an overlapping field of view with the sensor node; and one or more instructions that send at least one communication to the at least one other sensor node that is an information neighbor of the sensor node in response to the information-based event.

In this way, an improved technique to establish communication links among sensor nodes which reduces communication is provided. This technique also works with wireless sensor nodes.

BRIEF DESCRIPTION OF THE DRAWINGS

The techniques of the present invention can readily be understood by considering the following detailed description in conjunction with the accompanying drawings, in which.

To facilitate understanding, identical reference numerals have been used, where possible, to designate identical elements that are common to the figures. The drawings are not to scale and the relative dimensions of various elements in the drawings are depicted schematically and not to scale.

DETAILED DESCRIPTION

Those skilled in the art will realize that the present invention can be used to reduce communication among sensor nodes. Various embodiments of a sensor node and method of operating a sensor node, are provided. A sensor node detects a plurality of information-based events. The sensor node determines whether at least one other sensor node is an information neighbor of the sensor node based on at least a portion of the plurality of information-based events. The information neighbor has an overlapping field of view with the sensor node. The sensor node sends at least one communication to the at least one other sensor node that is an information neighbor of the sensor node in response to at least one information-based event of the plurality of information-based events.

In various embodiments, links between sensor nodes are formed based on the information that is shared by the sensor nodes, that is, the substantially concurrent detection of events by the sensor nodes. The links are typically communication links, and are also referred to as information links or information-based links.

Various embodiments of the present invention distribute image processing throughout the sensor nodes of a sensor network. Through in situ and distributed processing, various embodiments of the present invention improve the accuracy and speed of detection of an event. In addition, some embodiments may reduce the amount of manpower for surveillance monitoring through automating aspects of surveillance.

In this description, an event may also be referred to as a target. An event may be a person, animal or object. In various embodiments, an information-based event refers to an event which is identified based on an image. In other embodiments, the information-based event is identified based on non-image data.

Various embodiments of the present invention provide visual detection and tracking of relevant moving events through a large area in real time. Wireless sensor nodes have limited power. Capturing an image creates thousands of bytes of information that are to be processed. Various embodiments of the present invention provide a balance between processing, communications, timeliness and relevance of the image information.

Figure 1:
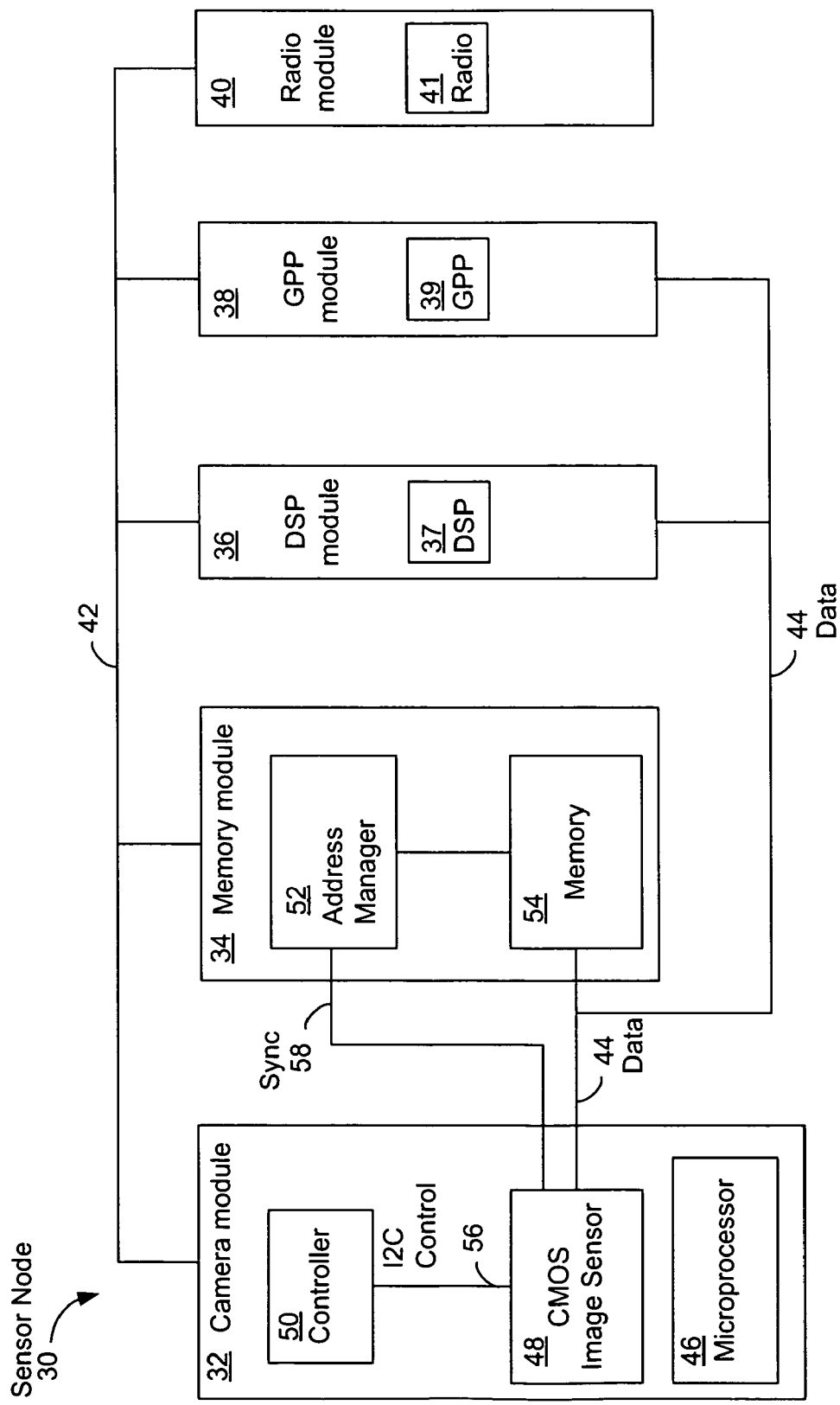
FIG. 1 depicts a block diagram of an embodiment of the hardware of a sensor node.

FIG. 1 depicts a block diagram of an embodiment of the hardware of a sensor node 30. In this embodiment, the sensor node 30 comprises a camera module 32, a memory module 34 which is used as a shared memory, a digital signal processor (DSP) module 36, a general purpose processor (GPP) module 38 and a radio module 40 coupled by one or more busses 42 and 44. The camera module 32 comprises a microprocessor 46, an image sensor 48, and a controller 50 to control the image sensor; and in some embodiments, the microprocessor 46 has a memory which stores instructions to be executed by the microprocessor and which also stores data. The memory module 34 comprises an address manager 52 and memory 54. The DSP module 36 has a DSP 37 which has a memory which stores instructions to be executed by the DSP 37 and which also stores data. The GPP module 38 comprises a GPP 39 which has a memory which stores instructions to be executed by the GPP and which also stores data.

One motivating concept that underlies various embodiments is conservation of power. In some embodiments, individual modules of the sensor node are typically in an inactive low-power state and are activated independently from other modules.

In some embodiments, the camera module 32 has a microprocessor 46 to perform initial image processing. The initial image processing is typically less complex than the image processing performed by the DSP module 36. In various embodiments, the microprocessor 46 is a low-power microprocessor. In some embodiments, the camera module 32 has direct access to the controller 50 of the CMOS image sensor 48 using I2C control signals 56. The camera module 32 acts as a first pass filter for the sensor node, and system, detecting anomalies in the image and activating the more capable DSP module 36. The camera module 32 is operatively connected to the memory module 34 so that captured images are stored in the shared memory 54. A sync signal 58 couples the address manager 52 to the image sensor 48 to synchronize the timing of providing raw image data to the memory 54.

The DSP 37 and the GPP 39 both have direct access to the shared memory 54 where the images are stored. In some embodiments, the data bus from the shared memory 54 to the DSP module 36 is also connected to the GPP module 38. Typically, the GPP 39 is a low-power microprocessor and comprises its own memory to store instructions to be executed by the microprocessor and to store data.

The sync lines 58 of the image sensor 48 of the camera module 32 are coupled to the address manager 52 of the memory module 34 to control the timing of the memory access to store and retrieve data. The address manager 52 of the memory module 34 generates addresses. In some embodiments, the shared memory 54 of the memory module 34, the DSP module 36, and the GPP module 38 can be used for processing and managing other types of sensors as well as the image sensor 48. The radio module 40 has a radio 41.

In other embodiments, one or more of the camera, shared memory, DSP, GPP and radio modules may be combined into a single module.

Figure 2:
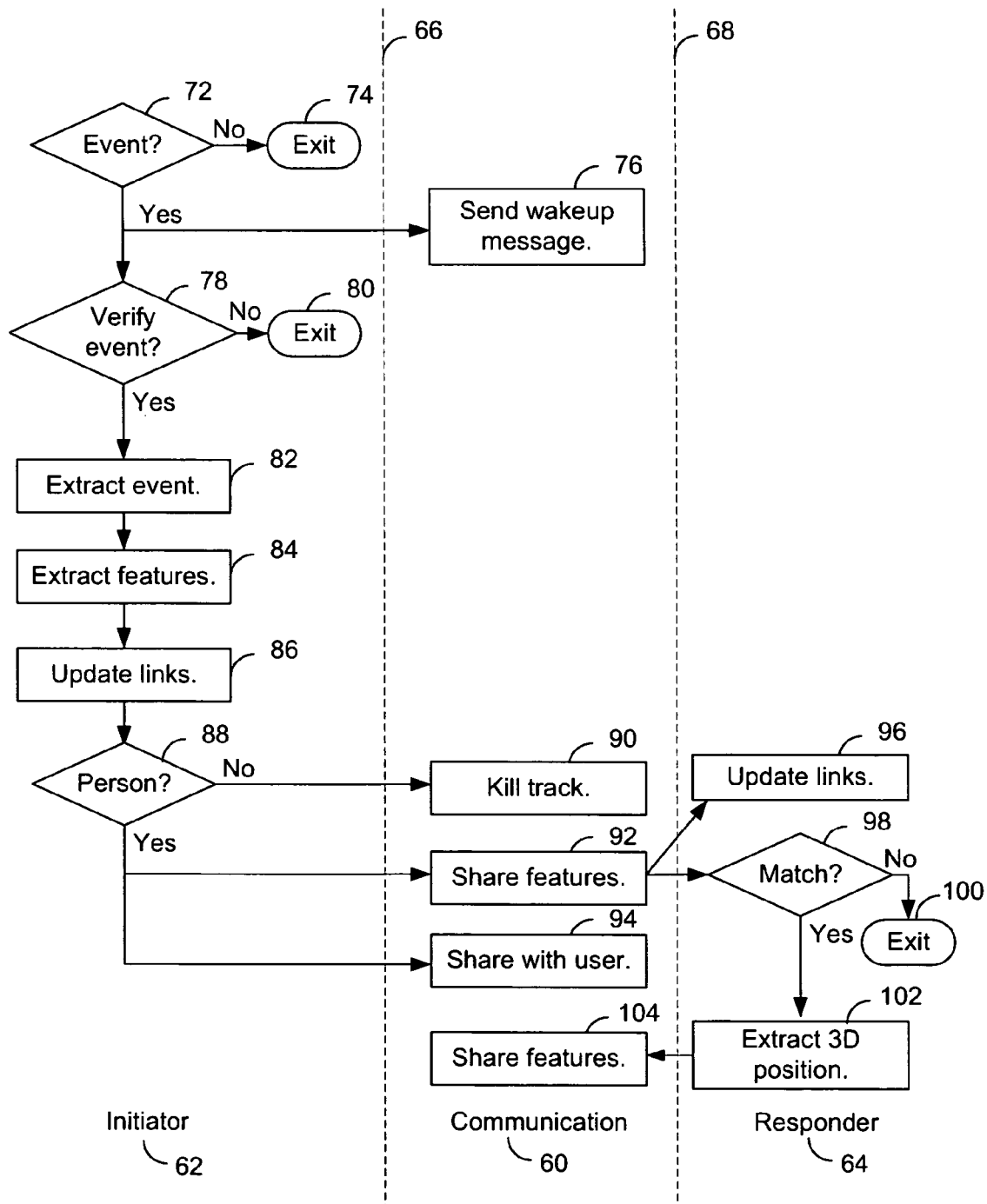
FIG. 2 depicts a flowchart of an embodiment of the flow of information between sensor nodes.

FIG. 2 depicts a flowchart of an embodiment of the flow of information between sensor nodes. The flow of information can be represented through the actions of and communications 60 between two of sensor nodes in which one sensor node is an initiator 62 and the other sensor node is a responder 64. Typically a sensor node can be both an initiator 62 and a responder 64. The communications 60 between the initiator 62 and the responder 64 are shown between dashed lines 66 and 68. The steps performed by the initiator 62 are shown to the left of dashed line 66. The steps performed by the responder 64 are shown to the right of dashed line 68.

In step 72, the initiator 62 determines whether an event is detected within its field of view based on the image that is captured by the image sensor of its camera module. The image that is captured is referred to as a captured image. In response to the initiator 62 detecting the event in its field of view (step 72), in step 76, the initiator 62 sends a wakeup message to one or more responders 64. In response to receiving the wakeup message, the responder 64 activates its camera module to capture an image and detect any event in that image. The initiator 62 typically sends the wakeup message to those responders 62 that are information neighbors.

In step 78, the initiator 62 verifies the event of the captured image. If the event is not verified, in step 80, the flowchart exits. If step 78 verifies the event, in step 82, the initiator 62 extracts the event from the captured image. In step 84, the initiator extracts one or more features of the event. In step 86, the initiator updates its links of information neighbors. The information neighbors comprise one or more responders 64. In some embodiments, the initiator 62 updates a list of information neighbors. In step 88, the initiator 62 determines whether a person is detected, that is whether the event is a person. If in step 88, the initiator 62 determines that a person is not detected, in step 90, the initiator 62 sends a kill track communication to its information neighbors. In response to a kill track communication, any responder 64 which is tracking that event stops tracking it. If in step 88, the initiator 62 determines that a person is detected, in step 92, the initiator 62 sends a share features message containing one or more features of the event to one or more responders 64, that is, information neighbors. In various embodiments, information is shared with responders 64 to determine the position of the events in the environment, to track events across the environment and to determine the position and orientation of the sensor nodes. In some embodiments, in step 94, the initiator 62 shares information with a user.

In step 96, in response to receiving a share features message from the initiator 62, the responder 64 updates its links, that is, information neighbors. In step 98, also in response to receiving the share features message from the initiator 62, the responder 64 determines whether there is a match. In other words, the responder 64 determines whether the features of the event that is detected by the initiator 62 match features of an event that is detected by the responder 64. If not, in step 100, the flowchart exits, and the responder may enter an inactive, low-power state. If in step 98 the responder 64 determines that there is a match, in step 102, the responder 64 extracts, that is, determines, a three-dimensional (3D) position of the event based on the shared features and the features of the event that is detected by the responder 64. In some embodiments, the three-dimensional position of the event is used to determine the position and orientation of the sensor node.

In step 104, the responder 64 sends a share features message to its information neighbors. In some embodiments, if the initiator 62 is not already included as an information neighbor, the responder 64 also sends the share features message to the initiator 62. In various embodiments, this share features message comprises one or more features of the event detected by the responder. In some embodiments, this share features message comprises the three-dimensional position of the event, and in some embodiments, a position and orientation of the responder sensor node.

In some embodiments, the features which are extracted are also used by the initiator and/or responder to classify the event into categories such as animals, vehicles, and people. Alternately, in step 88, the initiator 62 determines whether the detected event is an particular object, such as a vehicle, weapon or other specified object, and communications are sent based on whether the particular object is detected.

In various embodiments, the initiator-responder relationship described above depends on the immediate conditions of the environment, the specific sensor node, the features of an event (for instance, the position and direction of motion), and the mode of sensor node operation such as wakeup and share.

In response to step 72 determining that there is no image-based event, in step 74, the flowchart exits and the sensor node takes no further action with respect to this event. In various embodiments, the sensor node sleeps, that is, becomes inactive and enters a low power mode. In some embodiments, the sensor node may remain inactive for a predetermined amount a time, or until a detector, for example, a seismic or pulse infrared detector, coupled to the sensor node indicates that another type of event occurred, or until a wakeup message is received from another sensor node in the sensor network, and the sensor node will capture and analyze another image.

To maintain longevity, the sensor nodes periodically activate their camera module to capture an image to search for an event. The majority of the time that a system of sensor nodes is deployed, nothing will be happening in the environment. In various embodiments, the sensor nodes are meant to work at low duty cycles, cycling on for brief moments in time to capture an image to determine the occurrence of an event. The sensor node enters the wakeup mode when cycling on to capture an image to detect an event. The sensor node also enters the wakeup mode in response to receiving a wakeup message. If an event occurs, other sensor nodes are activated to capture information about the event. However, if the other sensor nodes cannot, at least potentially, gather information about the event, the sensor nodes would be consuming power unnecessarily; therefore, the lifetime of the sensor nodes may be reduced without any gain in performance. In various embodiments, the initiator selects one or more responders to wake-up and to share features based on the links which indicate the information neighbors of that sensor node. The links on the initiator are used to indicate which sensor nodes, that is, responders, may also detect that event in their field of view.

In share mode, information about an event is distributed across sensor nodes whose field of view is or may be crossed by the event. In various embodiments, the shared information about the event is used to create a fused view of the environment and the event. The information about the event may be used to calibrate the orientation and position of the sensor node, compute the three-dimensional position of the event, and differentiate the event, for example, as a human or a vehicle. In various embodiments, using the links, the responders with which information is shared are selected based on the overlap of the field of view of the initiator with the responder. Each initiator selects responders that are capable of capturing the same event as the initiator based on the overlap of the field of view between the initiator and a responder.

Figure 3:
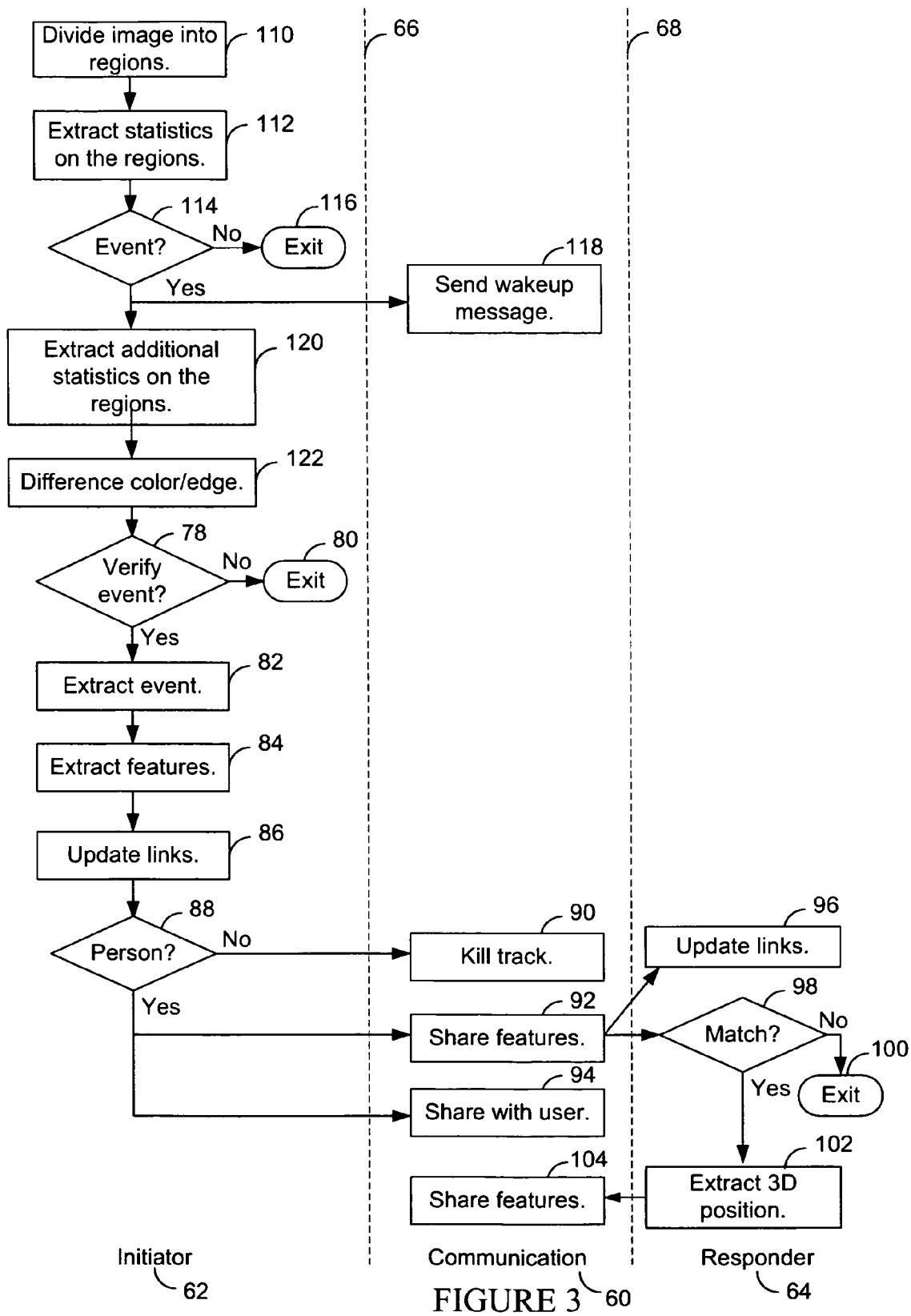
FIG. 3 depicts a flowchart of another embodiment of the flow of information between sensor nodes.

FIG. 3 depicts a flowchart of another embodiment of the flow of information between sensor nodes. One sensor node is an initiator 62 and another sensor node is a responder 64. In some embodiments, steps 110-114 and 120-122 of FIG. 3 correspond to step 72 of FIG. 2; and step 118 of FIG. 3 corresponds to step 76 of FIG. 2. In various embodiments, the initiator 62 performs its steps of the flowchart of FIG. 3 in response to waking up.

In step 110, the initiator 62 captures an image and divides the image into regions. An image has one or more regions. If an image has one region, the entire image is a single region and, step 110 is omitted. In step 112, the initiator 62 extracts statistics on the regions. In step 114, the initiator 62 determines the occurrence of an event based on the statistics that are extracted. If step 114 determines that there is no event, in step 116, the flowchart exits, and the sensor node typically becomes inactive.

In response to the initiator 62 determining, in step 114, that there is an event, in step 120, the initiator 62 extracts additional statistics on the regions. In step 122, the initiator determines a color/edge difference of the image. The color/edge difference will be described in further detail below with reference to FIG. 7.

In step 78, the initiator 62 verifies the event based on the additional statistics and the color/edge difference. Steps 80 to 104 are the same as in FIG. 2 and will not be further described.

Referring also to FIG. 1, steps 110, 112, 114, and 116 are performed by the camera module 32. In various embodiments, step 118, the sending of the wakeup message is performed by the GPP module 38 in response to the camera module 32 notifying the GPP module 38 of the event and the GPP module 38 causes the radio module 40 to send the wakeup message. Steps 122, 78, 80, 82 and 84 are performed by the DSP module 36. Steps 86 and 88 are performed by the GPP module 38. The communications 90, 92, 94, 104 and 118 are transmitted by the radio module 40. Steps 96, 98 and 100 are performed by the GPP module 38. Step 102 is performed by the DSP module 36, and the GPP module 38 communicates with the radio module 40 to send the share features message.

Figure 4:
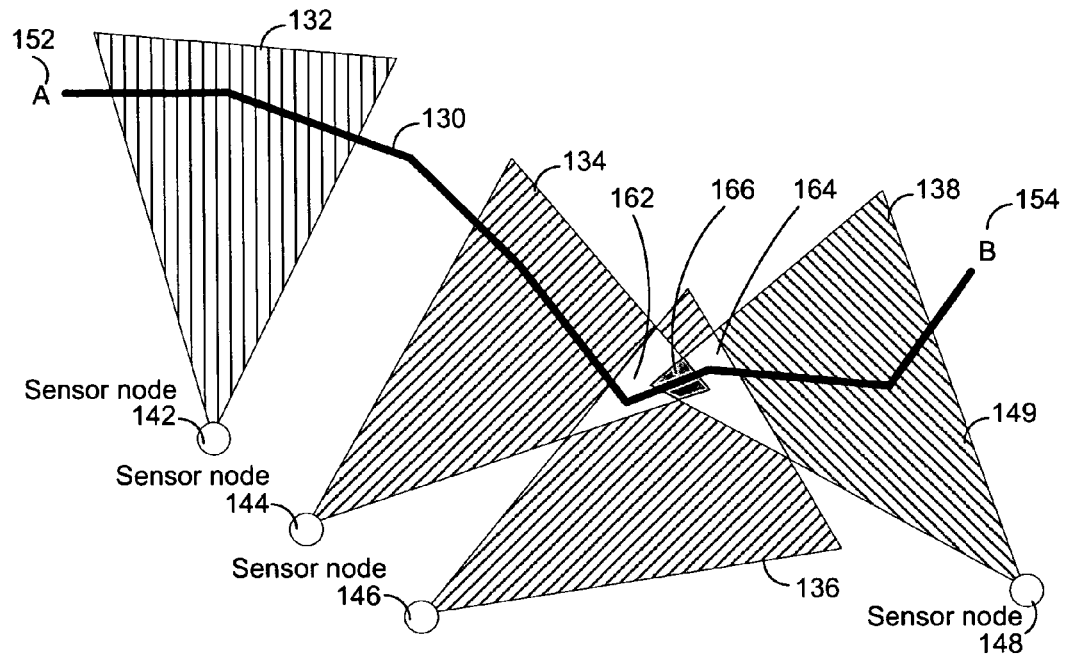
FIG. 4 depicts a plurality of illustrative sensor nodes and their fields of view.

FIG. 4 depicts a plurality of illustrative sensor nodes 142, 144, 146 and 148 and their fields of view 132, 134, 136 and 138, respectively. An illustrative path 130 of an event across the fields of view 132, 134, 136 and 138 is shown. The event starts at location A 152 and moves along path 130 to location B 154. The field of view 132, 134, 136 and 138 of each sensor node 142, 144, 146 and 148, respectively, is represented by a triangular area. The lined portion 149 of a triangular area indicates that portion of the field of view does not overlap with the field of view of any other sensor node. The solid portions 162, 164 and 166 of the triangular areas indicate an overlapping field of view. Solid portions 162 and 166 indicate that the fields of view of the sensor nodes 144 and 146 overlap in those areas. Solid portions 164 and 166 indicate that sensor nodes 146 and 148 overlap in those areas. Solid area 166 is darker than areas 162 and 164 indicates that the fields of view of three sensor nodes 144, 146 and 148 overlap in that area.

In FIG. 4, the sensor node has a directional camera having a limited detection range in terms of distance from camera which limits the field of view. A random placement of sensor nodes can result in great overlap in some areas and no coverage in other areas.

Information-based links will now be described in further detail. A sensor field can be represented as a graph G=(V,E), where V represents a sensor node and in a conventional sensor field, E is defined by shared radio connectivity. Typically for wireless communications, E is conventionally modeled as a static set of links which in effect use the location of the sensor nodes to determine communication. In various embodiments of the present invention, E is defined as a dynamic set of links which can vary based on three sets of variables: a particular sensor node, the event response, and in some embodiments the mode of sensor node operation such as wakeup and share. In various embodiments, the increased complexity of modeling E as a dynamic set advantageously reduces communication among sensor nodes and therefore increase the useful lifetime of a sensor field.

In various embodiments, because of the highly directional nature of the image sensors, the location of the sensor nodes which have the same field of view does not necessarily correlate with the physical distance between the sensor nodes. To improve performance and reduce communication, each sensor node maintains an information neighbor list. Each sensor node updates its information neighbor list through ad hoc communication between sensor nodes as an event is detected. For example, the information neighbor list is updated in steps 86 and 96 of FIGS. 2 and 3. The features of the event which are shared provide evidence either for or against an overlapping field of view based on the similarity of the features of the events and the timestamp of the feature extraction of both sensor nodes, that is, the initiator and responder. In contrast, the absence of similarity of the received features to the features of the event detected by the responder does not necessarily negate a hypothesis that the sensor nodes have an overlapping a field of view. The sensor node uses the shared features to adjust a score that is stored in the information neighbor list or table. The score represents a likelihood that both sensor nodes detect the same event and therefore have an overlapping field of view. In various embodiments, the score is a count representing a number of times that the sensor node detected the same event as another sensor node.

In various embodiments, the initiator-responder relationship is dynamic to the particular sensor node, the event response, and its mode of operation. The initiator-responder relationship is represented as a probability of a sensor node j detecting the same event as a sensor node i as follows:

$$P(j|i,x,dx,t) \quad \text{(Eq. 1)}$$

where x is the position vector of the event at a time t0, dx is the direction in which the event is moving at time t0, and t is the amount of time from time t0 for which a detection of the event at sensor node j is being predicted. In this way, in various embodiments, the same formulation of the problem can be used both for the wakeup and share modes. Setting t equal to 0 results in addressing direct overlapping fields of view which is the goal functionality of the share mode, while t>0 addresses event motion prediction which is the goal functionality of the wakeup mode. The event response is encapsulated in the position and direction of motion, x and dx, respectively.

In some embodiments, ideally, the probability of a sensor node j detecting the same event as a sensor node i is determined as follows:

$$P(j|i,x,y,z,dx,dy,dz,t) \quad \text{(Eq. 2)}$$

where x and y refer to the left-right and up-down directions in the image plane, respectively, and z refers to the distance from the image plane.

Figure 5:
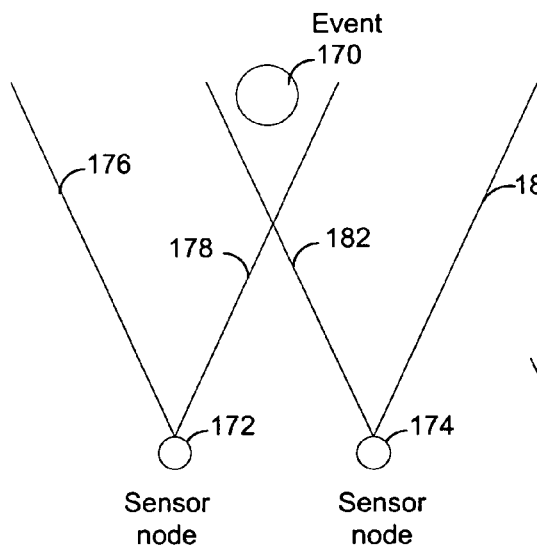
FIG. 5 depicts an illustrative event positioned in the field of view of two sensor nodes.

FIG. 5 depicts an illustrative event 170 positioned in the field of view of two sensor nodes 172 and 174. The field of view of the first sensor node 172 is defined by rays 176 and 178. The field of view of the second sensor node 174 is defined by rays 182 and 184. The three-dimensional position and motion direction of the event 170 can be used to determine which sensor nodes have overlapping fields of view. In various embodiments, a point in three-dimensional space will result in detections from the same set of sensor nodes, barring communication failures. To determine three-dimensional information, two-dimensional information from at least two sensor nodes is used. Therefore, to determine the three-dimensional position of an event, at least two-sensor nodes communicate with each other. Therefore, ideally, the best probability that can be achieved is:

$$P(j|i,x,y,dx,dy,dz,t) \quad \text{(Eq. 3).}$$

Figure 6:
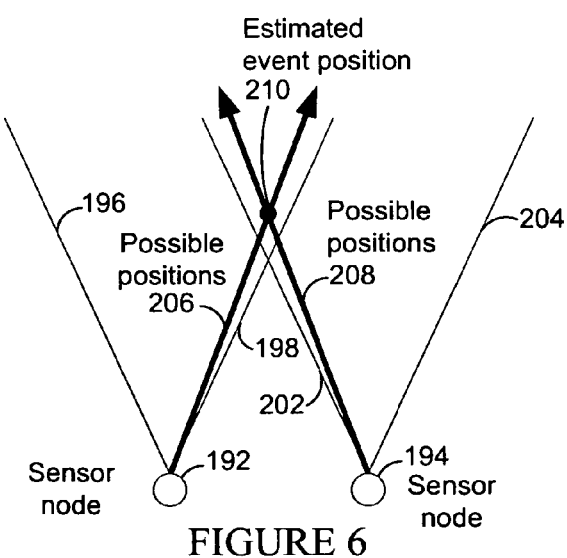
FIG. 6 depicts an estimation of a position of an event with two-dimensional information.

FIG. 6 depicts an estimation of a position of an event using two-dimensional information. In FIG. 6, two sensor nodes 192 and 194 have field of views defined by rays 196 and 198, and 202 and 204, respectively. Each sensor node 192 and 194 determines a ray 206 and 208, respectively, representing the possible positions of the event along a motion direction based on the sensed event position. The intersection 210 of the two rays 206 and 208 provides an estimate of the event's position in the environment. Thus a sensor node i estimates the probability of a sensor node j detecting the same event as a sensor node i from a ray in space rather than a point. Various embodiments use this estimation of event position to identify information neighbors to reduce communications.

In various embodiments, to determine overlapping fields of view, time t is set equal to zero, rather than using a time delayed prediction, that is, where t is non-zero. In response to t being equal to zero, dx, dy, and dz become 0 in computation. Therefore the probability of sensor node j detecting the same event as sensor node i becomes:

$$P(j|i,x,y) \quad \text{(Eq. 4).}$$

In various embodiments, relationships between sensor nodes are inferred from incomplete data. Using these inferred relationships, complex situations such as occlusions can be managed without additional computation. One advantage of this type of processing is its capability to provide useful estimates of the probability of sensor node j detecting the same event as sensor node i, without explicit, computationally heavy, representation.

Figure 7:
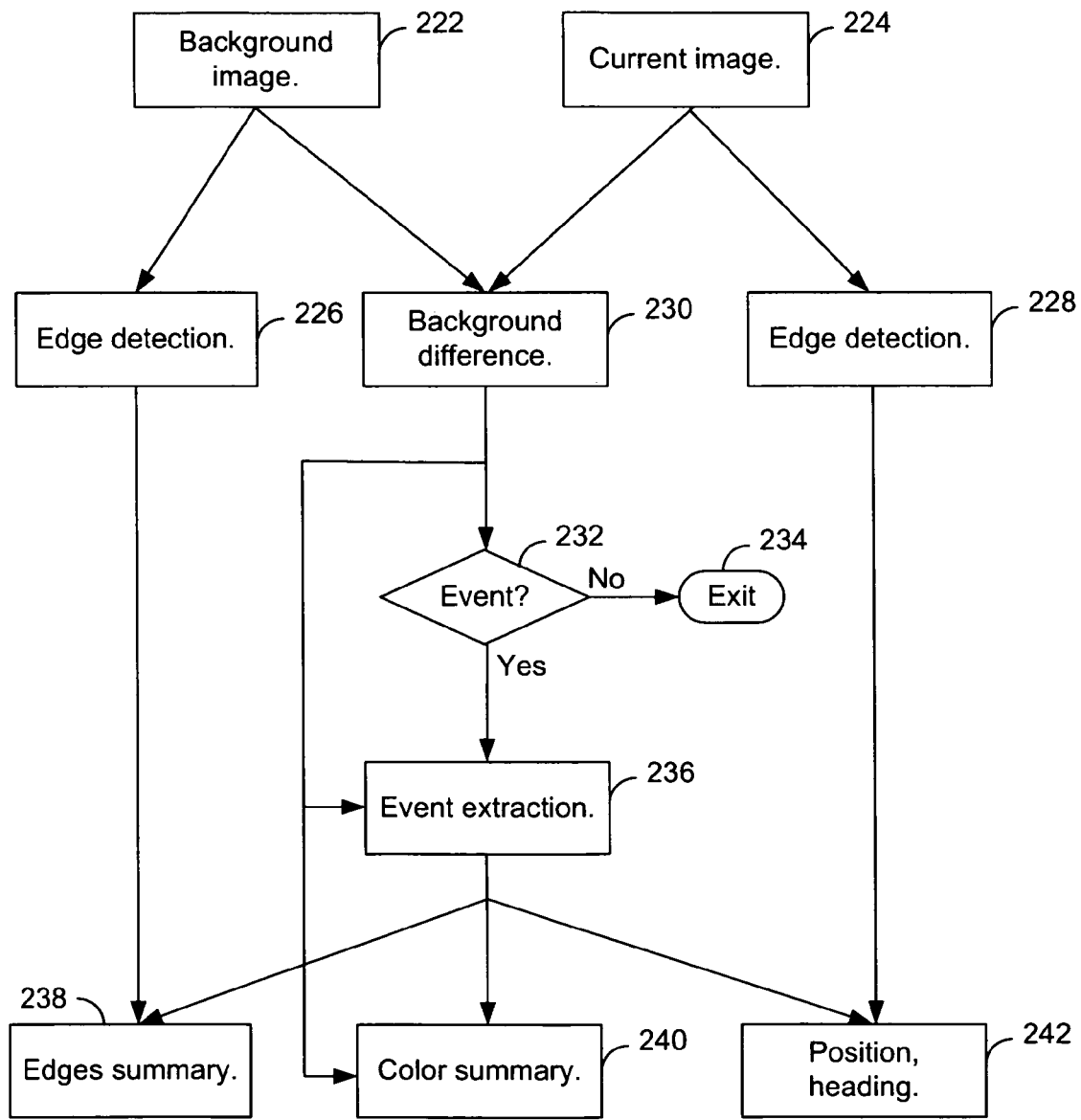
FIG. 7 depicts a flowchart of an embodiment of processing performed by a sensor node.

FIG. 7 depicts a flowchart of an embodiment of the processing performed by a sensor node. The images that are captured are processed to extract one or more features of the event which will be shared. The sensor node has a background image 222 and a current image 224. The background image 222 is captured by the sensor node and is determined not to contain an event, and the background image is captured prior to capturing the current image 224.

In step 226, the sensor node detects the edges of the background image 222. In various embodiments, the sensor node performs Sobel edge detection. In step 228, the sensor node detects the edges of the current image 224. In various embodiments, the sensor node performs Sobel edge detection. In step 230, the sensor node computes the background difference between the current image 224 and the background image 222. In various embodiments, steps 226, 228 and 230 are performed in step 122 of FIG. 3. In step 232, the sensor node determines the occurrence of an event based on the edges of the background image and current image, and the background difference. In some embodiments, step 232 corresponds to step 78 of FIGS. 2 and 3. If in step 232 the sensor node determines that there is no event, no further action is taken and the flowchart exits in step 234. If in step 232 the sensor node determines that an event occurred, in step 236 the sensor node extracts the event using the background difference information and provides an edges summary 238, a color summary 240 and a position and heading 242. The edges summary 238 is based on the edge detection 226 of the background image 222. The color summary 240 is based on the background difference. The position and heading 242 is based on the edge detection 228 of the current image 224. In various embodiments, another image, referred to as a second image, is captured after the current image, and the heading is determined based on the current image and the second image. In some embodiments, step 236 corresponds to step 82 of FIGS. 2 and 3.

Figure 8:
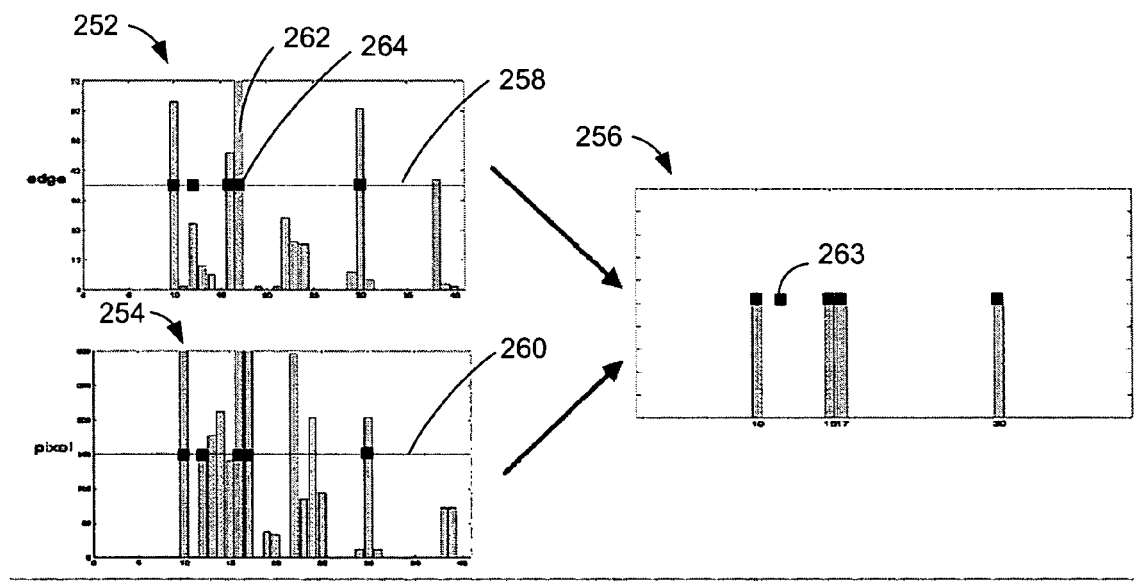
FIG. 8 depicts an illustration of fusion of data from an edge classifier and a pixel change classifier.

In various embodiments, in step 232, to determine whether an event is detected, the sensor node integrates results from two simple classifiers which provide acceptably robust detection of events. The first classifier detects changes in pixel values while the second classifier detects changes in edges using the well-known Sobel Edge Detector, described by R. Gonzalez and R. Woods' in Digital Image Processing (Addison Wesley, 1992, Reading, Mass., USA pp. 414-428), with in some embodiments additional constraints to take into account background movement due to wind. The results of the event detection are shown in FIG. 8 which illustrates that the combination of the two classifiers results in more robust detection.

In some embodiments, significant color changes are measured and determined as follows:

$$\text{color}(i,b) = \sum_{a \in P} \cdot 5*(\text{sign}\,(\delta|i_a - b_a| - c + 1), \quad \text{(Eq. 5)}$$

$$\delta(x) = 1 \quad \text{(Eq. 6)}$$
$$for$$
$$x > 0,$$
$$and$$
$$-1$$
$$for$$
$$x < 0$$

where P is the set of pixels in an image, i is the current image, b is the background image, c is a minimum difference between two pixels for which a significant color change will be determined.

In various embodiments, to compute edges, the Sobel edge detector is used. In some embodiments, two gradient masks, an x-directional gradient mask, Gx, and the y-directional gradient mask, Gy, respectively are used. An exemplary x-directional gradient mask, Gx, and y-directional gradient mask, Gy are shown below:

$$Gx = \begin{pmatrix} -1 & 0 & 1 \\ -2 & 0 & 2 \\ -1 & 0 & 1 \end{pmatrix} \quad \text{(Eq. 7)}$$

$$Gy = \begin{pmatrix} 1 & 2 & 1 \\ 0 & 0 & 0 \\ -1 & -1 & -1 \end{pmatrix}$$

The x-directional gradient mask, Gx, and the y-directional gradient mask, Gy, respectively, are applied to the image to compute the gradient in the x- and y-direction. A significant change in the number of edges is determined as follows:

$$edges(i, b) = \sum_{x,y \in P} \cdot 5 * (\text{sign}(ce_{ib}(x, y)) + 1) \quad \text{(Eq. 8)}$$

$$cei, b(x, y) = \left( \sum_{m=x-w}^{a+w} \sum_{n=y-w}^{b+w} \cdot 5 * (e_b(x, y) * e_i(m, n) + 1) \right) \quad \text{(Eq. 9)}$$

$$e_i(m, n) = \text{sign}(\delta g_i(m, n)) - s \quad \text{(Eq. 10)}$$

$$g(a) = |g_x| + |G_y| | a \quad \text{(Eq. 11)}$$

where w is the allowable margin for background motion and s is the threshold for a Sobel edge. In some embodiments, the threshold for the Sobel edges is set to select the top 2.5% of the gradients as edges. The top 2.5% refers to the magnitude of the response to the filter. In step 232, the sensor node detects an event based on the edge information and color difference.

Although an embodiment has been described with respect to a Sobel edge detector, the invention is not meant to be limited to a Sobel edge detector, and, in other embodiments, other edge detectors may be used.

In step 236, the sensor node performs event extraction. In event extraction, event segmentation reuses the results of the classifiers, that is, edge detectors and color difference in steps 226, 228 and 230, to segment event pixels from background pixels. In various embodiments, the boundaries are resolved at the resolution of a highly zoned image (12×12) to accommodate the errors inherent in the classifiers as well as to reduce memory and computational requirements. Pixels are selected as event pixels within the identified boundaries of an event using a lower pixel change constraint than is used at the boundaries.

The sensor node bounds the event in the image by dividing the image into a predetermined number of regions, for example, twelve horizontal regions. However, in other embodiments, the number of regions may be different from twelve. Regions may be used to reduce memory usage and to provide redundancy in case of noise. Using a heuristic of event shape, the sensor node assumes that the edges of the event in a single region are not rapidly changing. The boundaries of an event within a region, $b_s = \{l_s, r_s\}$, are selected as follows:

$$l_s = \min_x (i(x,y) - b(x,y) > \text{thresh}_1) \quad \text{(Eq. 12)}$$

$$r_s = \max_x (i(x,y) - b(x,y) > \text{thresh}_1) \quad \text{(Eq. 13)}.$$

The variable s of Equations 12 and 13 refers to a particular region. The sensor node uses pixel changes which exceed a predetermined threshold, $\text{thresh}_1$, to indicate the event location. The left boundary $l_s$ of the event is set by choosing the left most index which is associated with a pixel within the region where the difference between the current image pixel, i(x, y), and the background pixel, b(x, y), exceeds the threshold, $\text{thresh}_1$. The right boundary $r_s$ of the event is set by choosing the right most index which is associated with a pixel within the region s where the difference between the current image pixel, i(x, y), and the background pixel, b(x, y), exceeds the threshold, $\text{thresh}_1$.

In some embodiments, the sensor node reduces the criteria for event pixels to include pixels which may be more similar to the background within the detected bounds. A lower threshold, $\text{thresh}_2$, is used to select pixels within the bounds to create a set of pixels belonging to the event:

$$EP = i(x,y) | l_{x/12} < x < r_{x/12} \& i(x,y) > \text{thresh}_2 \quad \text{(Eq. 14)}.$$

In Equation 14, EP is the set of pixels belonging to the event. Choosing to have a secondary threshold, $\text{thresh}_2$, may also reduce the error caused by dividing the image into regions. Using a lower threshold allows pixels that are part of the event and that are similar to the background to be selected for EP.

In step 236, the sensor node also extracts features of the event from the image information. In some embodiments, the feature extraction of step 236 is performed in step 84 of FIG. 3. In various embodiments, one or more features of the event are extracted from the image based on colors and edges and are used to correlate the event across sensor nodes. In some embodiments, features, such as the position and heading of the event are also determined for higher level reasoning, potentially to determine the three-dimensional position of the event or sensor nodes.

In various embodiments, the types of edges in the event are characterized. In some embodiments, using a histogram, the edges are differentiated into 0, 22.5, 45, 66.5, 90, 112.5, 135, or 157.5 degree edges. The angle of the edges is calculated using the ratio of the gradient in the y-direction to the gradient in the x-direction. The gradient information is used to characterize the edges of the event. For example, the edges of non-articulated events such as a vehicle tend to be constant from different viewpoints as those events move; and the edges of articulated events such as persons, tend to vary as they move. Therefore, an event may be characterized based on the angle of its edges.

In some embodiments, an image is captured in YUV format because of its luminance and chrominance separation. The "Y" represents the luminance component, and "U" and "V" represent the chrominance or color components. Although luminance is useful in event detection and extraction, the luminance of an event tends not to stay constant across different image sensors and time. Using the UV values from the captured image data, the event is characterized by the color distribution. Color histograms of the U and V components are created separately as well as in combination.

Once the event is detected, the local position of an event within the field of view of the sensor node is determined. The position of the event, (Cx,Cy) is determined as follows:

$$C_x = \frac{\sum_{i=0}^{n} x_i}{n}, C_y = \frac{\sum_{i=0}^{n} y_i}{n}. \quad \text{(Eq. 15)}$$

The variables $x_i$ and $y_i$ are pixel positions belonging to the event in the image. The calculation assumes that the mass of the event is equally dense and thick. In various embodiments, this calculation provides a sufficiently accurate approximation of the position of the event using a single two dimensional image.

The heading is determined by capturing a second image after an event is detected in the current image, also referred to as the first image, calculating the position of that event, and approximating the directional heading based on the position of the event in the first and second images. In some embodiments, the second image is captured after a predetermined amount of time from capturing the first image. In various embodiments, the heading is approximated to one of eight directions. In this way, a comparison of the position of the event in the x-direction and y-direction is performed to determine the heading. For example, the position of the event in the first image is (Cx1, Cy1) and the position of the event in the second image is (Cx2, Cy2), and the heading is represented as a tuple (direction x, direction y). If Cx1=Cx2, direction x is equal to 0. If Cx1<Cx2, direction x is equal to 1. If Cx1>Cx2, direction x is equal to −1. If Cy1=Cy2, direction y is equal to 0. If Cy1<Cy2, direction y is equal to 1. If Cy1>Cy2, direction y is equal to −1. In another example, if Cx and Cy are the same for the first and second images, the event is not moving and the heading (x,y) is equal to (0,0). If Cx for the second image is greater than Cx for the first image, and Cy is not changed, the event is moving to the horizontally to the right of the sensor node and the heading is equal to (1,0). If Cx is unchanged, and Cy of the second image is less than Cy of the first image, the event is moving away from the sensor node and the heading is (0,−1).

FIG. 8 depicts an illustration of fusion of data from an edge classifier and a pixel change classifier for an image. Bar chart 252 illustrates the results of an edge classifier. The x-axis represents a particular pixel and the y-axis represents the output of the edge classifier in accordance with Equation 8.

Bar chart 254 illustrates the results of a pixel classifier for the image of bar chart 252. The x-axis represents a particular pixel, and the y-axis represents the output of the pixel classifier in accordance with Equation 5.

Bar chart 256 illustrates the fusion of the results of the pixel and edge classifiers associated with the bar charts 252 and 254, respectively.

In bar charts 252 and 254, the bars which extend above the horizontal threshold line 258, 260, indicate pixels at which the classifier identified a significant change. The black squares 264 indicate the occurrence of a real event.

The fused events of bar chart 256 comprise those pixels for which a significant change is detected by both the edge and pixel classifiers, that is, both the edge classifier and the pixel classifier exceed their respective threshold for the same pixel. The four fused events illustrated by the bars associated with pixels 10, 16, 17 and 30 in bar chart 256 correspond to real events, and one real event that is indicated by block 263 is not detected.

In various embodiments, the features of the event which are shared among sensor nodes comprise at least one or any combination of: the position of the event in the image, the heading, the color histogram(s) of the event, the types of edges of the event, and a timestamp of the event.

Information-Based Links

In various embodiments, a sensor node determines its information neighbors and establishes information-based links. The sensor node determines and updates its information neighbors in the update links steps, 86 and 96, of FIGS. 2 and 3. The sensor node establishes link weights, also referred to as scores, in real-time through the adjustment of one or more tables in response to receiving messages such as the wakeup message 76 (FIG. 2) or share features message 92 (FIG. 2). A position is associated with an x-component, a y-component and a z-component. The x-component refers to a horizontal position across the plane of the image sensor of a sensor node. The y-component refers to a distance above the ground plane. In various embodiments, an event is viewed as fixed to the ground plane, therefore, the y and dy components of the formulation for implementation are removed. The z-component refers to a distance away from the sensor node, that is, the depth along the ground plane. Therefore, in this embodiment, the probability of a sensor node j detecting the same event as a sensor node i is:

$$P(j|i,x,dx,dz,t) \quad \text{(Eq. 16)}.$$

The variables dx and dz are estimated by analyzing two images, which in some embodiments, are captured close together in time. In various embodiments, the sensor node waits for a predetermined amount of time after capturing the first image to capture the second image. The heading in the x direction is dx, and is subclassed into −1, 0, or 1 as described above. The heading in the z direction is dz and is measured from the difference in the number of pixels which are associated with the event which are detected and subclassed into −1, 0 and 1 as described above. If the number of pixels which are associated with the event increases, the sensor node determines that the event is moving closer to the image sensor in the z direction. If the number of pixels associated with the event decreases, the sensor node determines that the event is moving away from the sensor node in the z direction. The classification of −1, 0 and 1 is a coarse estimate of direction and is reflective of the coarse event segmentation. However, the invention is not meant to be limited to a subclassification of three comprising −1, 0 and 1; in other embodiments, more subclasses or fewer subclasses may be used. For example, another subclassification may comprise −2, −1, 0, 1 and 2.

In various embodiments, to reduce memory requirements and facilitate the generalization of the input data to areas with no supporting data, the sensor node divides the image into regions {x0, x1, . . . , xn} spanning the length of the image. The sensor node maintains a count of the total number of detections of events that occurred in the region and for each possible information neighbor, and the number of corresponding detections of events within the time frame t. In some embodiments, the sensor node stores the detection counts in the memory of the GPP as illustrated in Table 1. Table 1 has a list of regions, x0, x1, x2, . . . , xn, and a count for the number of detections of events in a particular direction for each sensor node in that region. Each row of the link table comprises detection counts in a particular heading or direction. For example, (dx0, dz0) refers to detections in which the event is stationary, (dx1, dz1) refers to those detections in which the event is moving to the right in the x direction and moving closer to the sensor node in the z direction. The cells of the link table comprise a set of one or more sensor node-detection count pairs, (id, detection_count), where id is the sensor node identifier. Once the total number of detections reaches a predefined detection count threshold for a specific region, the probabilities estimated in the link table are considered to provide an accurate prediction of the set of responders. In some embodiments, the values of the detection counts in the link table are halved after at least one of the detection count values exceeds the value of the predefined detection count threshold times two. Adjusting the detection count values helps to prevent overflow of integer values on the microprocessor. The detection count threshold is used to determine if there is sufficient support for reducing communication by sending messages to the sensor nodes which have contributed responses to the probability of having an overlapping field of view or probability of predicted motion, and not sending messages to other sensor nodes. In some embodiments, another threshold value is used against the probability of being an information-based link which can vary according to the system's power consumption and accuracy constraints. For greater accuracy, a lower threshold is chosen which increases communication, and therefore has greater power consumption. A higher threshold may reduce communication and therefore reduce power consumption, but may omit some communication, and therefore reduce accuracy. Table 1 is an illustrative link table that is used to determine detection probabilities to identify the information-based links. Table 1 is typically stored in the internal memory of the sensor node, such as the memory of the GPP module.

TABLE 1

A link table comprising detection counts
with other sensor nodes in various directions

|  | $X_0$ | $x_1$ | $x_2$ | ... | $X_n$ |
|---|---|---|---|---|---|
| number of detections |  |  |  |  | ... |
| (dx-1, dz-1) |  |  |  |  | ... |
| (dx-1, dz0) |  |  |  |  | ... |
| (dx-1, dz1) |  |  |  |  | ... |
| (dx0, dz-1) |  |  |  |  | ... |
| (dx0, dz0) |  |  |  |  | ... |
| (dx0, dz1) |  |  |  |  | ... |
| (dx1, dz-1) |  |  |  |  | ... |
| (dx1, dz0) |  |  |  |  | ... |
| (dx1, dz1) | (1, 6) |  |  |  | ... |
|  | (2, 1) |  |  |  |  |
|  | (3, 5) |  |  |  |  |

For example, Table 1 is a link table for a sensor node having an id of 1. Three tuples are shown for region $X_0$ for heading (dx1,dz1). A first tuple (1,6) is for sensor node 1 itself, and sensor node 1 detected and verified 6 events in region $X_0$. A second tuple (2,1) indicates that sensor node 1 detected the same event as sensor node 2 one time in region $X_0$. A third tuple (3,5) indicates that sensor node 1 detected the same event as sensor node 3 five times in region $X_0$.

Relative Camera Position and Event Tracking

If an event is simultaneously detected by more than one sensor node, the relative physical displacement of the sensor nodes can be determined with respect to each other. Three components of extrinsic orientation that can be determined separately are rotation, scaling, and translation. The scalability of distributed calibration and tracking will now be illustrated with respect to the scaling and translation of sensor nodes relative to one another. In some embodiments, using a technique disclosed by B. K. P. Horn, H. M. Hilden, and S. Negahdaripour, in Closed-form solution of absolute orientation using orthonormal matrices, in *Journal of the Optical Society of America*, July 1998, scaling is estimated as follows in Equation 17:

$$s = \left( \sum_{t=1}^{n} \|r'_{j,t}\|^2 \bigg/ \sum_{t=1}^{n} \|l'_{i,t}\|^2 \right)^{1/2} \quad \text{(Eq. 17)}$$

and translation as, $$t = \overline{r_j} - s(\overline{r_i}) \quad \text{(Eq. 18)}$$

The variable $r'_{i,t}$ indicates the position vector of the event at time t from camera i, relative to the average detected position vectors, $r_i$. In some embodiments, each sensor node maintains a state vector of translation and scaling in the x and y directions, $[t_x, t_y, s_x, s_y]$, which describes the sensor node's physical relationship to the information-based neighbors described in the previous section.

Figure 9A:
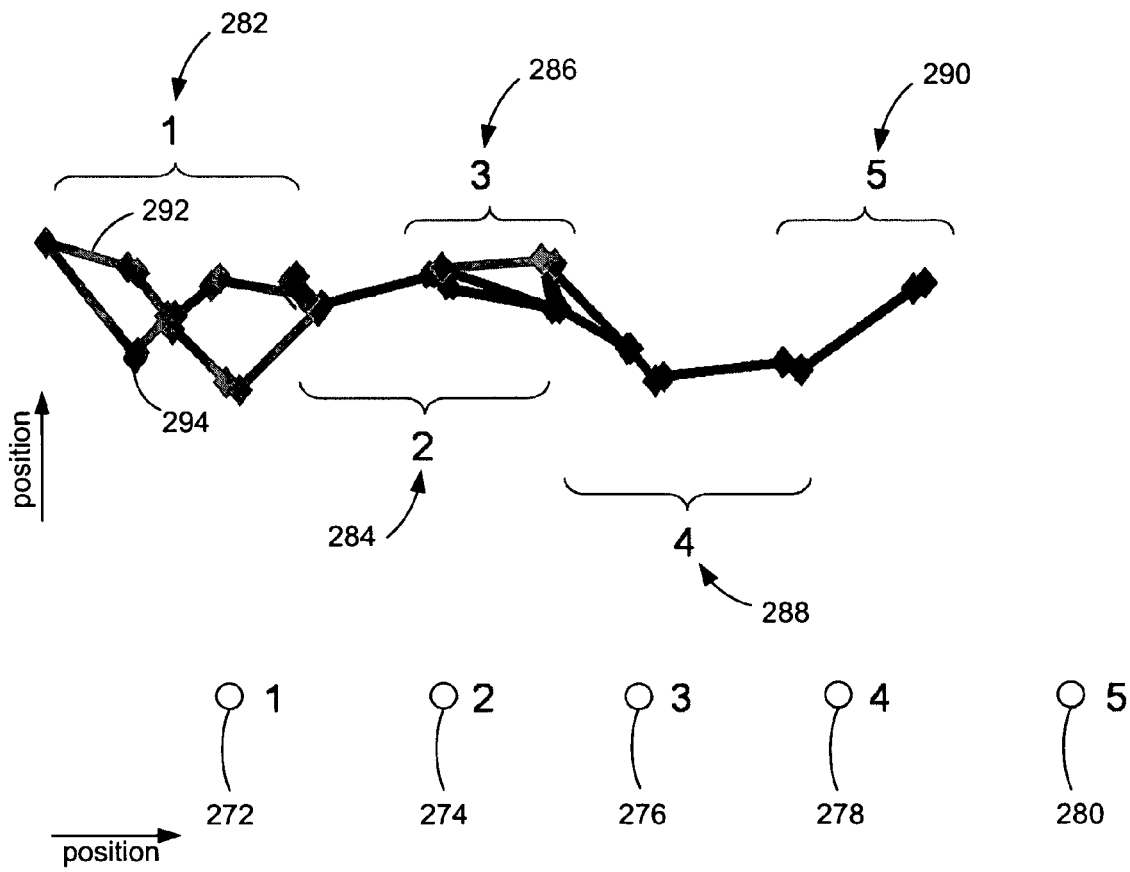
FIG. 9A depicts five exemplary sensor nodes and the track of an event.

FIG. 9A depicts five exemplary sensor nodes 272, 274, 276, 278 and 280 and the track 282 of an event. The sensor nodes 272, 274, 276, 278 and 280 are arranged in a line. The positions of the sensor nodes and the event are estimated using the calibration algorithm of Equations (17) and (18).

Each sensor node infers a partial track of the event from the observable event positions in its field of view. The braces indicate the partial track of the event in the field of view for each sensor node. For example, brace 1 corresponds to the field of view and partial track of the event in sensor node 1. More generally, brace i corresponds to the field of view and partial track of the event in sensor node i. The diamonds on each partial track indicate the detected position of the event. This state, that is, the track of the event, is distributed across a plurality of sensor nodes in the sensor field, and a complete view of the track can be determined with respect to any point in the sensor field. The partial track information can be accumulated across the sensor field, each sensor node translating and scaling the track according to its perspective.

Figure 9B:
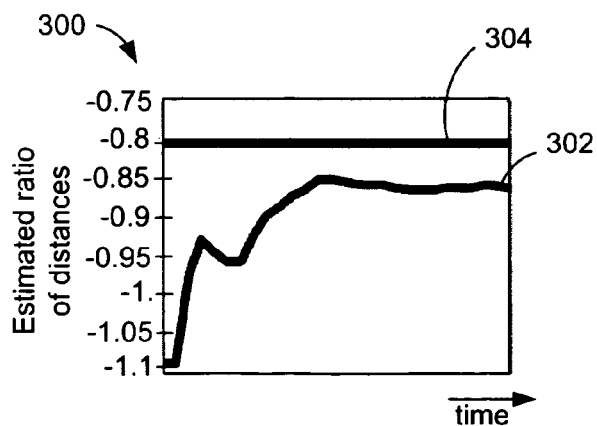
FIG. 9B depicts a graph of an estimation of a ratio of relative distances between three sensor nodes of FIG. 9A.

FIG. 9B depicts a graph 300 of an estimation of a ratio of the relative distances between three of the sensor nodes of FIG. 9A. Over time, the estimated ratio 302 approaches the ground truth 304. The relative distance between sensor nodes 1 and 2, and sensor nodes 2 and 3 is to be determined. The distance between sensor nodes 1 and 2 is set equal to 1 distance unit. Therefore, the distance between sensor nodes 2 and 3 is based on 1 distance unit.

In FIG. 9B, the x-axis represents time, and the y-axis represents the ratio of the relative distance between sensor nodes 1 and 2 with respect to the distance between sensor nodes 2 and 3, that is, (the distance between sensor nodes 1 and 2)/(distance between sensor nodes 2 and 3). As time progresses and more events are detected, the estimated values of the sensor node's state vector, and therefore, the ratio of the relative distance, becomes closer to ground truth 304, which is equal to −0.8. Because this state is distributed through the sensor field, a complete view of the track of the event can be determined from any point in the sensor field. The partial track information can be accumulated across the sensor field, each sensor node translating and scaling the track according to its perspective.

Various embodiments of the software of various modules of FIG. 1 will now be described.

Camera Module

The camera module 32 of FIG. 1 comprises software, that is, instructions which are stored in the memory of the microprocessor of the camera module, or an external memory accessible to the microprocessor, and is executed by that microprocessor. In various embodiments, the software of the camera module 32 detects an event.

Figure 10:
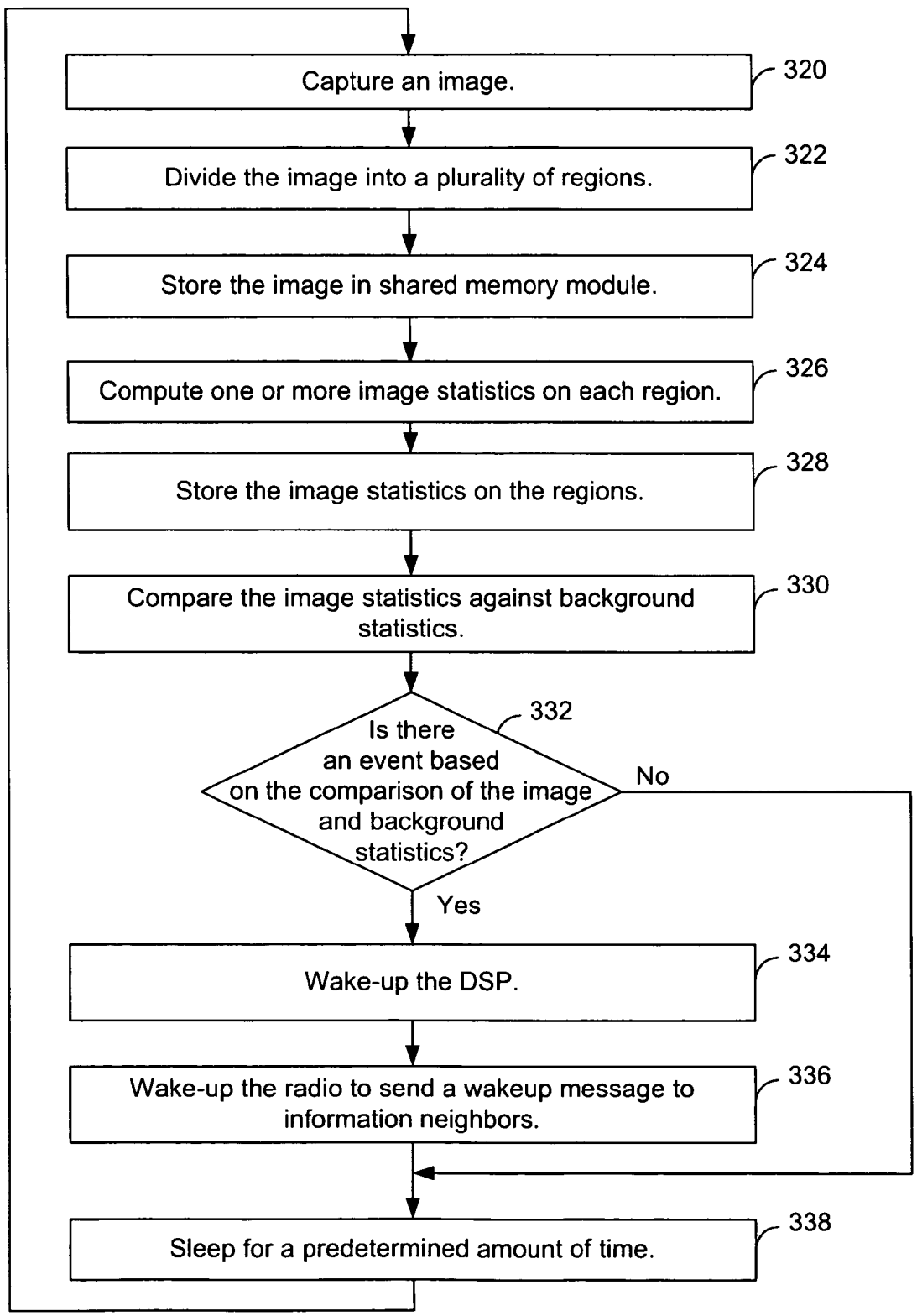
FIG. 10 depicts a flowchart of an embodiment of software implemented in the camera module of the sensor node of FIG. 1.

FIG. 10 depicts a flowchart of an embodiment of software implemented in the camera module of the sensor node of FIG. 1. In step 320, an image is captured by the image sensor of the camera module. In step 322, the camera module divides the image into a plurality of regions. In some embodiments step 322 corresponds to step 110 of FIG. 3. Dividing the image into regions effectively lowers resolution. For example, if an image has 100 pixels in the x direction, and there are 5 regions, each region is associated with 20 pixels in the x direction. In another embodiment, an image is subdivided into regions in the y direction. In yet another embodiment, an image is subdivided into regions in both the x and the y directions. In yet another embodiment, an image is subdivided into regions in both the x and the y direction, and the direction of motion of the event in x, y, and z.

In step 324, the camera module stores the image in the shared memory module.

In step 326, the camera module computes one or more image statistics on each region. Step 326 corresponds to step 112 of FIG. 3. In step 328, the camera module stores the image statistics on the regions. The image statistics are stored in a memory such as the memory on the camera module or the shared memory module. In various embodiments, the image statistics comprise at least one of the mean and standard deviation in color space.

In step 330, the camera module compares the image statistics against background statistics which are stored in the shared memory to determine if more analysis is to be performed. The background statistics are based on an image that is previously captured for which no event is detected. In some embodiments, a comparison equation incorporates the mean, standard deviation across time of the mean, and standard deviation in color space (updated in the memory module by the GPP or DSP), and the result of the comparison equation is used to determine whether an event occurred.

In step 332, the camera module determines whether an event occurred based on the comparison. Step 332 corresponds to step 114 of FIG. 3. For example, if the change between the mean of a set of pixels that are detected at some time and the average mean of the pixels in the past is greater than the standard deviation of that mean, the camera module determines that an event is detected.

In various embodiments, in response to detecting an event, the camera module triggers higher level processes. In step 334, the camera module wakes up the DSP, for example, through a hardware interrupt or software trigger through a shared bus to indicate the detection of an event by the camera module. In step 338, the camera module wakes up the radio to send the wakeup message to information neighbors. Step 338 corresponds to step 118 of FIG. 3.

In step 338, the camera module sleeps for a predetermined amount of time. In some embodiments, in response to receiving a wakeup message from another sensor node, the sensor node activates the camera module to capture an image.

In step 332, if no event is detected based on the comparison of the image and background statistics, step 332 proceeds to step 338 to sleep.

In some embodiments, the camera module may be activated by the DSP, or GPP, to capture another image to extract motion information.

DSP Module

The DSP module of FIG. 1 comprises software, that is, one or more instructions, which is stored in a memory within or accessible to the DSP and is executed by the DSP. In various embodiments, the DSP module processes multiple frames or images from the image sensor that are stored in the shared memory module.

Figure 11A:
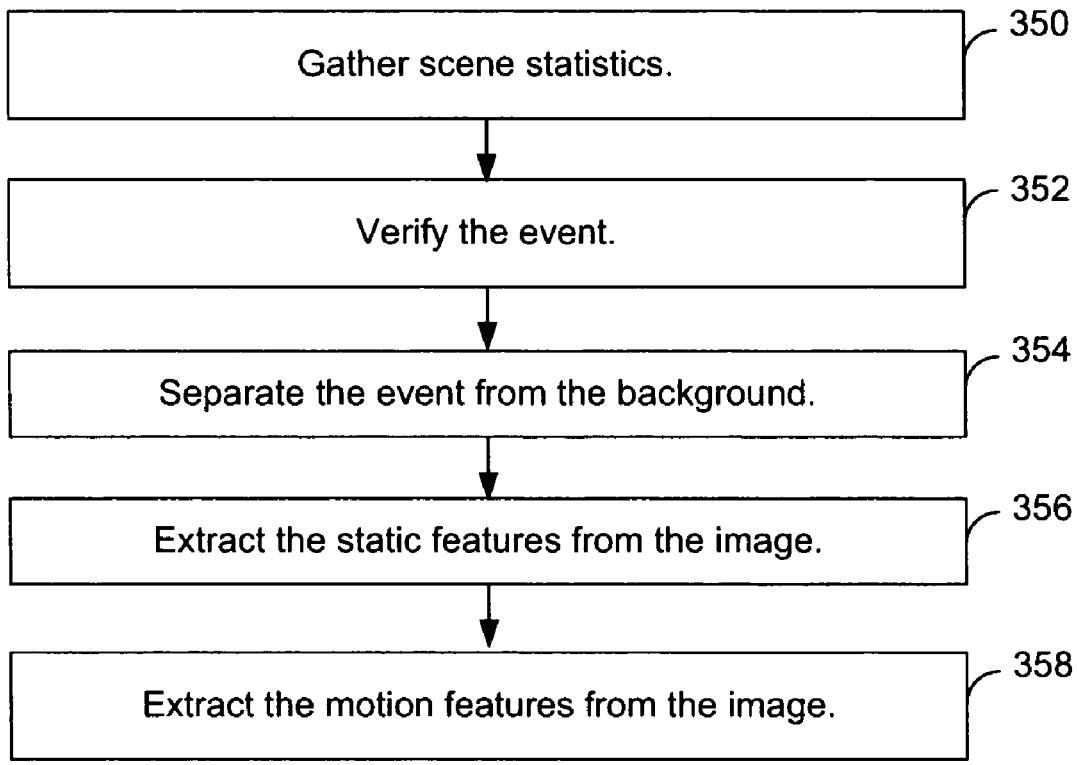
FIG. 11A depicts a flowchart of an embodiment of software implemented in the digital signal processor module of the sensor node of FIG. 1.

FIG. 11A depicts a flowchart of an embodiment of the DSP module software. The DSP module wakes up, for example, in response to the camera module detecting an event, and performs the flowchart of FIG. 11A. In step 350, the DSP gathers scene statistics. Scene statistics are gathered for an uncertainty adjustment. In some embodiments, if the image information is not good enough, the image information and the associated event are disregarded and other sensors are not notified of the event. For example, if the image is too dark, the sensor node may not send a share features message to other sensor nodes. In various embodiments, step 350 is performed in step 120 of FIG. 3. In other embodiments, step 350 is omitted. In an alternate embodiment, step 350 is performed by the GPP module.

In step 352, the DSP module software verifies the event. The DSP module uses at least one more sophisticated algorithm than the camera module to verify the event.

In step 354, the DSP module separates the event from the background of the image. Step 352 corresponds to step 82 of FIGS. 2 and 3, and step 236 of FIG. 7. The DSP module performs background/foreground separation to separate the event. In some embodiments, the DSP module performs a well-known technique referred to as Connected Component which segments the foreground into events.

The DSP module extracts one or more features of the event from the image. In step 356, the DSP module extracts one or more static features using at least one or any combination of a color histogram, edge histogram, centroid, x/y ratio, and haar wavelets. Step 356 corresponds to step 84 of FIGS. 2 and 3.

In step 358, the DSP module extracts one or more motion features of the event such as the direction or heading and, in some embodiments, velocity, using static features such as a centroid of the event, across multiple images. Step 358 is also performed in step 84 of FIGS. 2 and 3.

Figure 11B:
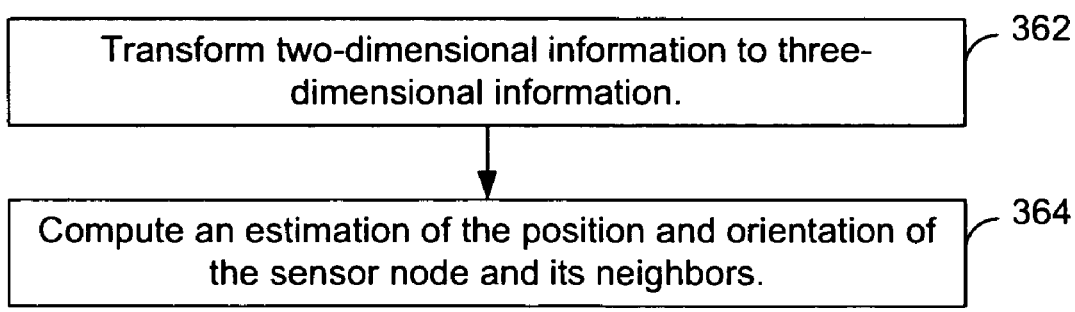
FIG. 11B depicts a flowchart of an embodiment of software implemented in the digital signal processor module which is performed in response to receiving one or more features from another sensor node.

FIG. 11B depicts a flowchart of an embodiment of software implemented in the digital signal processor module which is performed in response to receiving one or more features from another sensor node. The DSP module performs the flowchart of FIG. 11B in response to the GPP module determining that an event that is detected by the sensor node matches the features that are received from another sensor node. Steps 360 and 362 are performed in step 102 of FIGS. 2 and 3.

In step 360, the DSP module transforms two-dimensional (2D) information to three-dimensional (3D) information.

In step 362, the DSP computes an estimation of the position and orientation of the sensor node and its neighbors. In various embodiments, the DSP also computes an estimation of the three-dimensional position, and in some embodiments, heading of the event.

Radio Module

In various embodiments, the radio module is activated in response to detecting an event by a sensor node, that is, an initiator. One or more sensor nodes that are information neighbors of the initiator are notified of the event using the radio of their radio module. The radio module also has a microprocessor and memory, accessible to the microprocessor, which stores software, that is, one or more instructions, to be executed by the microprocessor. The radio module has one or more software modules which perform a Wakeup, Trigger State Selection, communication with a user and a Time Sync.

In Wakeup, the radio module transmits a wakeup message indicating that an event is detected. In various embodiments, the radio module transmits the wakeup message to each information neighbor, one information neighbor at a time. Alternately, the radio module broadcasts the wakeup message to all sensor nodes within radio distance. In various embodiments, the wakeup notifies information neighbors of the detection of the event. In some embodiments, in response to receiving the wakeup message, the sensor node increases the capture rate of the camera module.

In Trigger state selection, the radio module shares one or more features of an event with information neighbors, typically, one information neighbor at a time using the share features message. The radio module shares one or more features of the event that can be used for event identification with information neighbors, to help to distinguish events from one another. The radio module shares one or more position and motion features with information neighbors to establish the position and direction of motion of the event, and the position and orientation of the cameras of the sensor nodes. The position and direction of motion of the event in the image, and in some embodiments, velocity of the event, is shared with the information neighbors. In some embodiments, the histograms of the event, the height of the event, and width of the event are also shared.

A false alarm communication is sent in response to an event not being verified after the event is detected by the camera module and a wakeup message is sent. In some embodiments, the radio module shares one or more features of the event that is associated with the false alarm to reduce computation on irrelevant events.

In some embodiments, the radio module is used to communicate with a user. The radio receives a query from a user, and sends a response to the query to the user. In this way, the user's information may be updated. This information may be regarding an event or may comprise software updates to any of the modules.

In various embodiments, the radio module also performs a Time Sync. In some embodiments, the radio module appends time stamps on the image capture and transmission to determine global relative time.

General Purpose Processor

In various embodiments, the general purpose processor module adjusts the communication links. In some embodiments, the software, which comprises one or more instructions, of the GPP module maintains a list of information neighbors with probabilities P established over time, and the GPP module enhances calculations by correlating direction of motion with neighbors. In various embodiments, these probabilities P are of a sensor node j detecting the same event as sensor node i. In some embodiments, these probabilities are estimated or determined from a histogram or link table maintained by the sensor node across the probability space. Table 1, described above, is an exemplary link table. In various embodiments, the histogram or link table at a sensor node j comprises a detection counter which represents a count of the number times sensor node i detected an image-based event, and an overlap counter which represents the number of times that the feature information of an event that is detected by sensor node i overlaps with, that is matches, the feature information of an event from a sensor node j. Sensor node "i" has "detection counter" $R(i,x)$, where x represents a point, or in some embodiments, a region, in the event space defined by (position, direction of motion), and an "overlap counter" $O(i,j,x)$ for each sensor node j from which sensor node i receives information. The histogram or table is initialized to set the values of the detection counter(s) and overlap counter(s) to zero.

Figure 12:
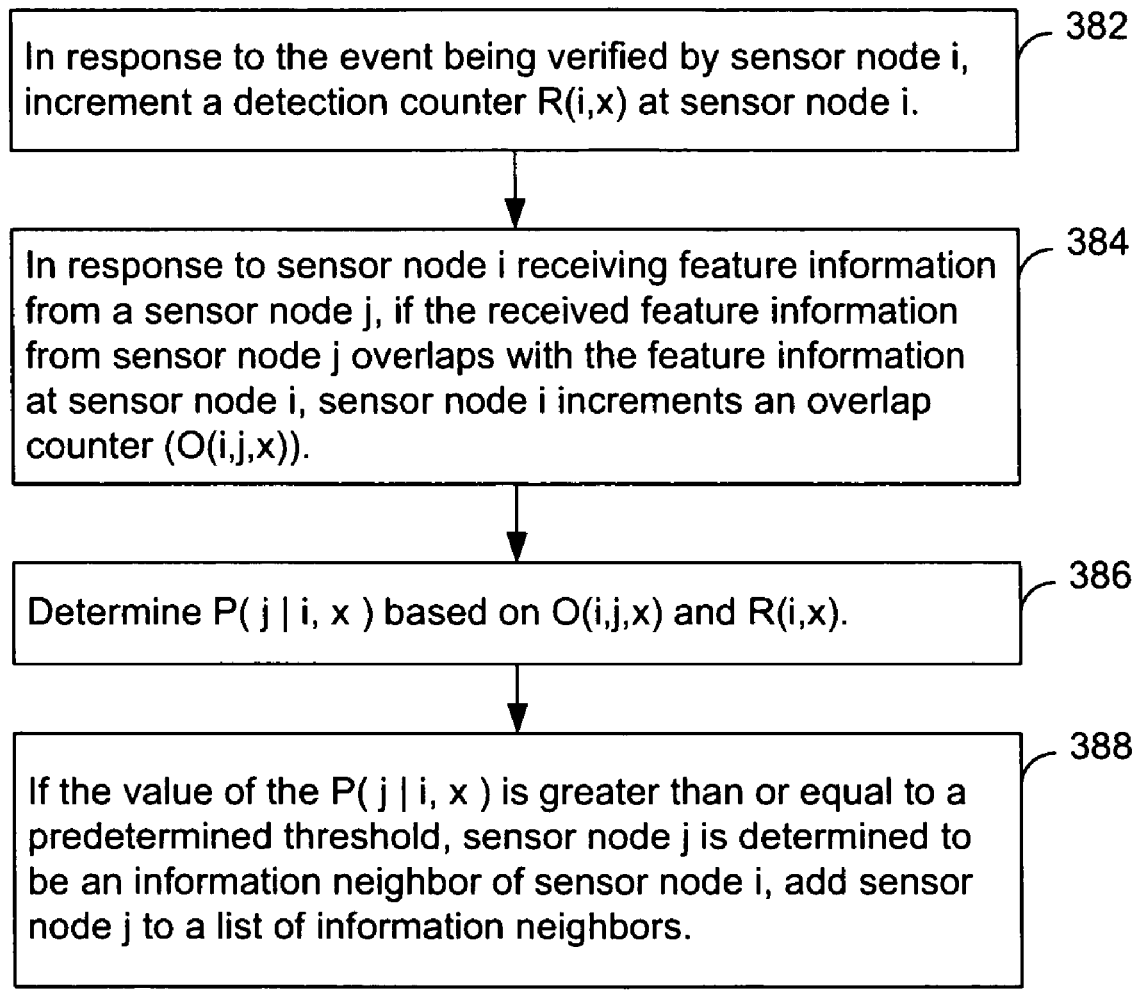
FIG. 12 depicts a flowchart of an embodiment of software implemented in the general purpose processor module of the sensor node of FIG. 1.

FIG. 12 depicts a flowchart of an embodiment of software implemented in the general purpose processor of the sensor node of FIG. 1. The flowchart of FIG. 12 updates the link table of Table 1 which is illustrated above. In various embodiments, steps 382-386 of FIG. 12 are performed in the "Update Links" blocks 86 and 96 of FIGS. 2 and 3.

In step 382, in response to verifying an event by a sensor node i, a detection counter $R(i,x)$ is incremented at sensor node i. The detection counter $R(i,x)$ is contained in the link table. In various embodiments, the detection counter is provided for each region at sensor node i, and the detection counter for each region which contains the verified event is incremented.

In step 384, in response to sensor node i receiving feature information from another sensor node, for example, sensor node j, if the feature information from sensor node j overlaps with, that is, matches, the feature information at sensor node i, sensor node i increments the overlap counter ($O(i,j,x)$). The variable x represents the count. The overlap counter is contained in the link table of Table 1. In various embodiments, overlap counters for sensor node i which is associated with sensor node j are maintained for each region of sensor node i as shown in Table 1. In various embodiments, an image comprises one or more regions, and the count x is for a particular region. In some embodiments, multiple counters may be incremented if the event spans multiple regions.

If the feature information of an event from sensor node j does not overlap with, that is, match, the feature information of an event at sensor node i, sensor node i takes no further action to update the table or histogram.

In step 386, the probability $P(j|i, x)$ is determined. $P(j|i, x)$ is equal to the value of $O(i,j,x)/R(i,x)$.

In step 388, if the value of the $P(j|i, x)$ is greater than or equal to a predetermined threshold, sensor node j is determined to be an information neighbor of sensor node i, and sensor node j is added to a list of information neighbors in the shared memory. In some embodiments, a sensor node j is determined to be an information neighbor of a sensor node i if the value of $O(i,j,x)/R(i,x)$ is greater than a predetermined neighbor threshold, and added to the list of information neighbors. In various embodiments, a sensor node j is determined to be an information neighbor of a sensor node i if the value of $O(i,j,x)/R(i,x)$ is greater than a predetermined neighbor threshold, where $O(i,j,x)$ is for one of the regions, and is added to the list of information neighbors.

In some embodiments, the sensor node transmits information only to information neighbors in response to the total number of detections $R(i,x)$ reaching a predetermined detection threshold for at least one region. Alternately, the sensor node adds another sensor node to the list of information neighbors in response to the total number of detections $R(i,x)$ associated with the other sensor node reaching a predetermined detection threshold for at least one region.

In various embodiments, probabilities are maintained for each possible information neighbor. In some embodiments, for example, memory constrained sensor nodes, information neighbors having a low value or a value of zero in the overlap counters are removed from the list of information neighbors, and in various embodiments, the link table. In some embodiments, a low value is a value below a predetermined low-threshold.

In some embodiments, the link table and the list of information neighbors may be re-initialized if the position of a sensor node is changed, or if the position of the image sensor of a sensor node is changed.

In various embodiments, the software of the GPP module determines whether features of an event that is detected by the sensor node match the features of an event that are sent by another sensor node. In some embodiments, the sensor node determines that there is a match even if the features of the detected event may not be exactly the same as the features that are received from another sensor node, but are substantially similar. In various embodiments the GPP module uses a correlated table of centroids, identifiers, time, and direction is used to determine whether an event is a particular event. In some embodiments, the software of the GPP module merges features of detected events across sensor nodes and time. For example, if two sets of features from two sensor nodes are determined to describe the same event, the two sets of features are combined into a single set. In some embodiments, the software of the GPP uses the Viola-Jones AdaBoost which parallelizes/distributes computationally expensive operations such as face detection through the sensor nodes of the sensor network.

In various embodiments, the software of the GPP module tracks events. In some embodiments, the proximity of tracks of separate events influences identification assignment.

In some embodiments, the software of the GPP module reports to the user and performs a query, determines the response to the query, and performs updates using the radio.

In various embodiments, the software of the GPP module adjusts the background. In some embodiments, the GPP module analyzes motion changes in background to weight changes due to lighting and background motion.

In some embodiments, the software of the GPP module adjusts uncertainty. In some embodiments, the GPP module weights feature values based on scene statistics. In some embodiments, for example, if the image information is not good enough, the image information and the associated event are disregarded and other sensor nodes are not notified of the event. For example, the image and event may be disregarded if the image is too dark.

Sensor Network

In various embodiments, when no events are occurring in the network, the sensor node remains in a power-conservation or low-power mode, in which one or more modules are turned on or activated periodically at a slow rate. The camera module periodically checks images for possible events, and stores statistics for the GPP module, which has a slower wakeup rate, to use to maintain an updated background image. The GPP module also determines the usefulness of the image during its wakeup time. The memory module also wakes up periodically in connection with the camera module, DSP module and GPP module. The radio module will also periodically sync the system clock with other nodes.

In various embodiments, a sensor network comprises a plurality of sensor nodes. Referring back to step 76 of FIG. 2 and step 118 of FIG. 3, in response to detecting an event, the initiator sends the wakeup message to sensor nodes which are information neighbors. Typically, at startup, the information neighbors comprise by default all sensor nodes which are within radio distance of the initiator node. A sensor node is within radio distance if that sensor node is able to receive the wakeup message from the initiator. Using various embodiments, over time, the sensor nodes of the sensor network will adjust to find a subset of one or more sensor nodes which are information neighbors, that is, that have an overlapping field of view, to reduce communication and therefore power consumption. In some embodiments, an information neighbor is also determined based on the overlap between regions of an image. For example, if a sensor node i detects an image-based event in a region 2, and based on a histogram or table, described above, that is stored in sensor node i, sensor node i determines that a sensor node j is an information neighbor with respect to regions 3, 4 and 5, but not 2, sensor node i does not send the wakeup message and feature information to sensor node j. In another example, if sensor node i determines that a sensor node k is an information neighbor with respect to region 2, sensor node i sends the wakeup message and feature information to sensor node k.

The wakeup message allows other sensor nodes to quickly learn that an event may be in the area. In various embodiments, the wakeup message is sent to each information neighbor rather than all sensor nodes within radio distance and therefore conserves power. In some embodiments, over time, in response to receiving a wakeup message, a responder determines whether that wakeup message is from an information neighbor and if so, continue processing based on subsequent information from that information neighbor, otherwise, if the wakeup message is not from an information neighbor, the responder will not continue processing in response to the wakeup message and return to a power conservation mode. In various embodiments, the responder wakes up and captures an image even if the wakeup message is not from an information neighbor.

In various embodiments, in step 88 of FIGS. 2 and 3, the probability of the event being a particular event is also determined. In various embodiments, the particular event may be a person, animal, vehicle, weapon or another specified object. In some embodiments, an event is determined to be the particular event if the probability of the image containing the particular event exceeds a first predetermined particular-event threshold. In some embodiments, in response to the probability that the image contains the particular event being greater than or equal to the first predetermined particular-event threshold, the image sensor also transmits, that is, shares, this information with user. In response to the probability of the image containing the particular event being less than a second predetermined particular-event threshold, the initiator transmits a kill track message, via its radio, to tell other sensor nodes not to track this event. In various embodiments, the second predetermined particular-event threshold has a value less than the first predetermined particular-event threshold. In some embodiments, if it is uncertain that the image contains the particular event, that is, the probability of the image containing the particular event, the sensor node continues to track the image-based event, and in some embodiments, escalate the processing by, for example, capturing and analyzing images more frequently, and in some embodiments, sending a message notifying other sensor nodes that a possible particular event is detected with information about the possible particular event.

Results

Various findings will now be described for embodiments of the technique for an information-based link weight algorithm in a simulated and a real environment.

Simulated Results

Figure 13:
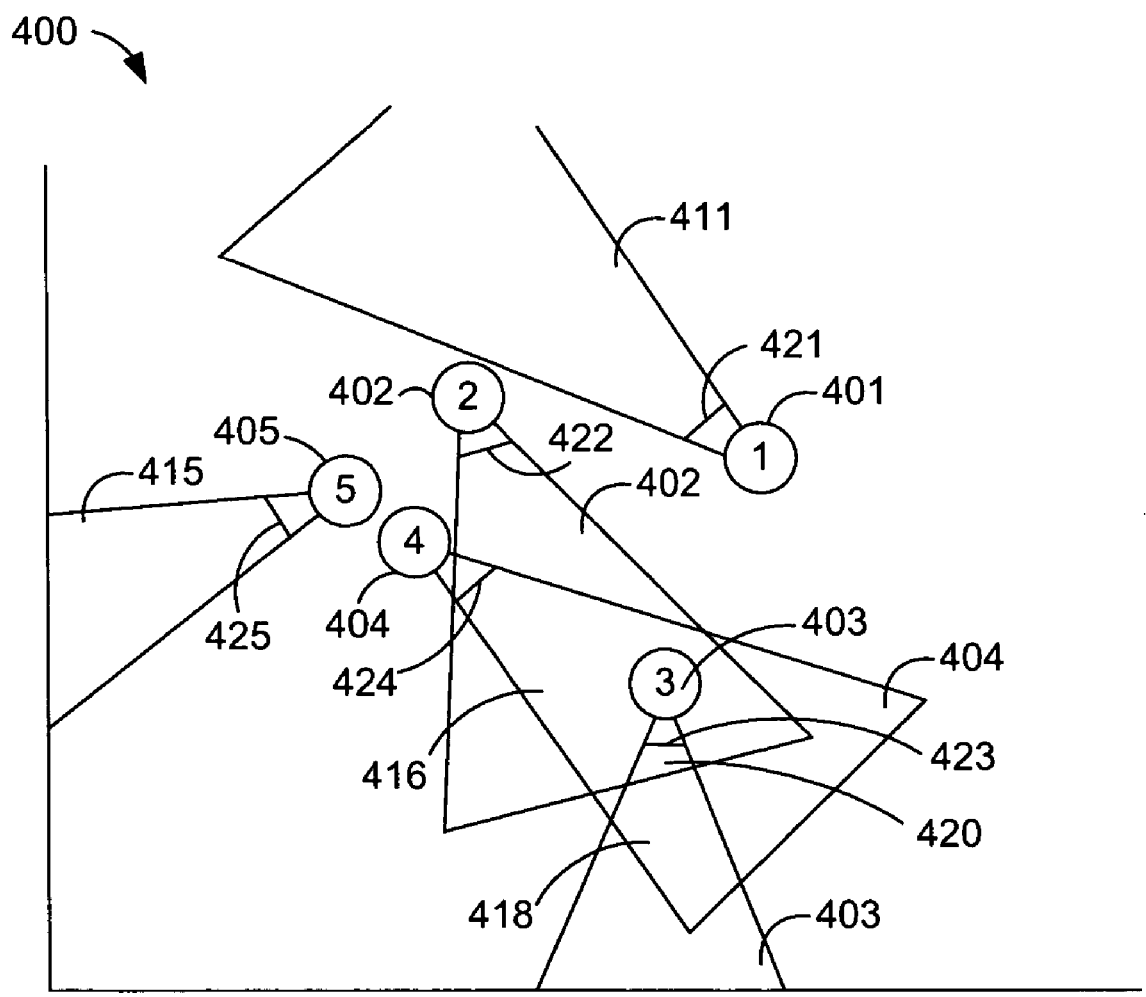
FIG. 13 depicts a diagram of an illustrative sensor field comprising five sensor nodes.

FIG. 13 depicts an exemplary sensor field, that is, a set 400 of sensor nodes 401, 402, 403, 404 and 405. The sensor node identifier is shown in the circle representing the sensor node. Data is generated by placing the set 400 of sensor nodes 401-405 in random positions and orientation in a two-dimensional space, ignoring the up-down direction, as shown in FIG. 13. Each sensor node 401, 402, 403, 404 and 405 has a field of view as illustrated by the triangular area 411, 412, 413, 414 and 415, and an image plane 421, 422, 423, 424 and 425, respectively. In this example, a variety of situations occur in the sensor field. Two sensor nodes, sensor nodes 1 and 5, 401 and 405, respectively, have no overlapping field of view with any other sensor node. Two areas of overlap 416 and 418 are within the field of view of two sensor nodes, sensor node 2 402 with sensor node 4 404, and sensor node 3 403 with sensor node 4 404, respectively. One area of overlap 420 is within the field of view of three sensor nodes, sensor node 2 402, sensor node 3 403 and sensor node 4 404.

Figure 14:
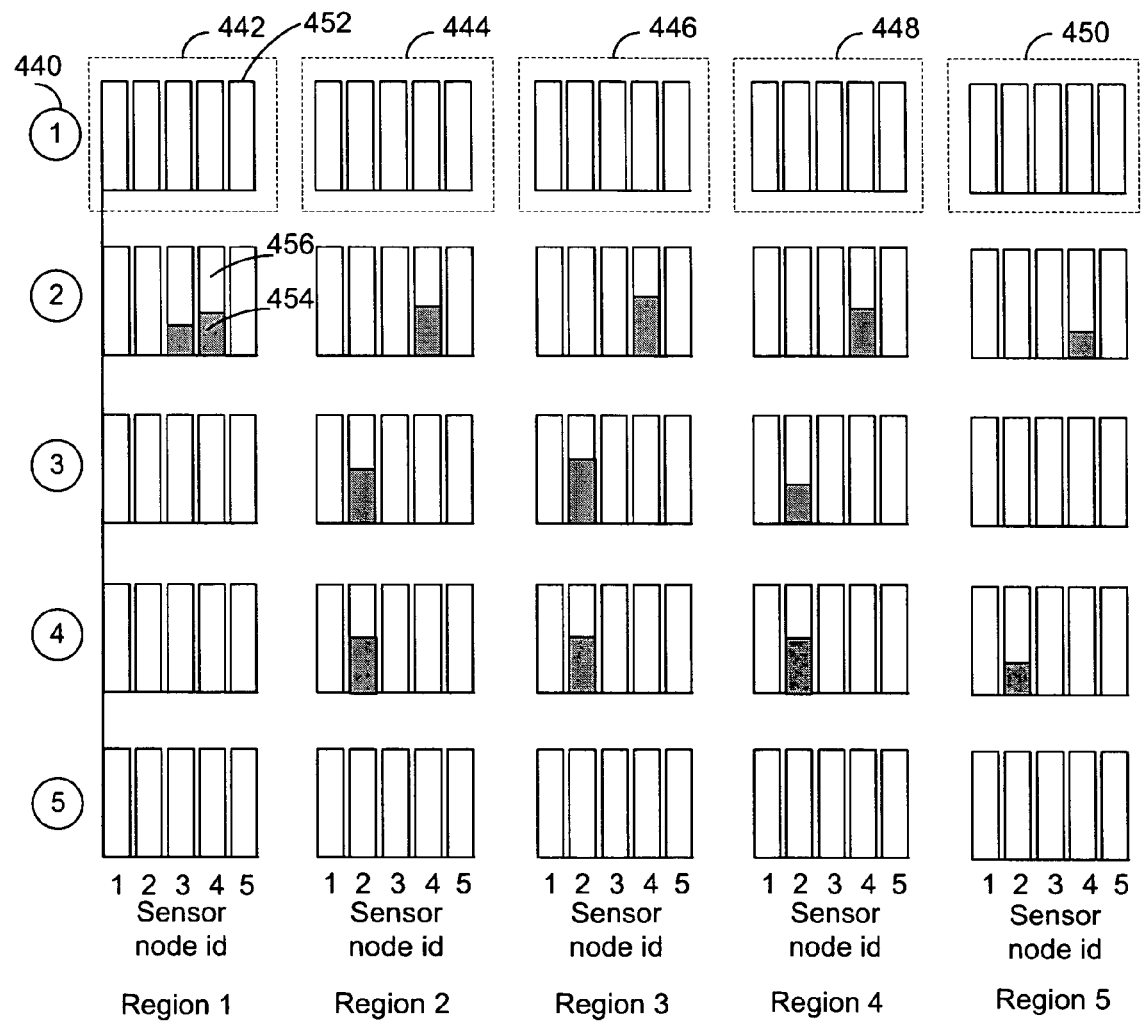
FIG. 14 graphically depicts the probability of overlap for a specific region of a sensor node's field of view for a simulation of an event track in the illustrative sensor field of FIG. 13.

FIG. 14 graphically depicts the probability of overlap for a specific region of a sensor node's field of view for a simulation of an event track in the illustrative sensor field of FIG. 13. The event's track is simulated across the sensor field of FIG. 13 for 1,000 seconds, generating 1,000 potential data points for estimating the probability. The event's position is projected onto the image plane of each sensor node, and its position along the image plane is recorded as the detected x position of the event for that sensor node.

The probability tables shown in FIG. 14 depict the results of the simulation after one thousand seconds (t=1000) and illustrate the probabilities of the detected overlapping fields of view. Each row indicates a sensor node's response to one or more detected events. Each row of the table is associated a sensor node i, five in all. The sensor node identifier (id) 440 for a sensor node i is shown at the left of each row. Each set 442, 444, 446, 448, 450 of bars 452 represents one of the five regions in an image, x at sensor node i. Each bar 452 of the set is associated with a sensor node j, and represents the P(j|i, x). The shaded area 454 within a bar indicates the probability of detection, P(j=1|i, x), that sensor node j has an overlapping field of view with sensor node i when the event is in region x. The unshaded area 456 within a bar represents P(j=0|i, x), the probability that sensor node j does not have an overlapping field of view with sensor node i when the event is in region x. From the results illustrated in FIG. 14, sensor nodes 1 and 5 do not have any overlapping fields of view with any other sensor nodes, corresponding correctly to FIG. 13, where sensor nodes 1 and 5 do not have any overlapping fields of view. Sensor nodes 3 and 4 both have responses, indicated by the shaded areas, across multiple regions with sensor node 2, which corresponds with FIG. 13. The outlying regions, regions 1 and 5, have less of a response because those regions of overlap are smaller. Sensor node 2's estimated probability from FIG. 14 illustrates the directional nature of the information-based links. A response to sensor node 4 exists in all regions, but there is a response to sensor node 3 only in the first region. As shown in FIG. 13, sensor node 3 points downward from the middle of the field of view of sensor node 2 and only covers a small portion of sensor node 2's field of view. Although information for smaller areas of overlapping fields of view may be incomplete, this algorithm allows a sensor node to take advantage of the information that it has.

Figure 15:
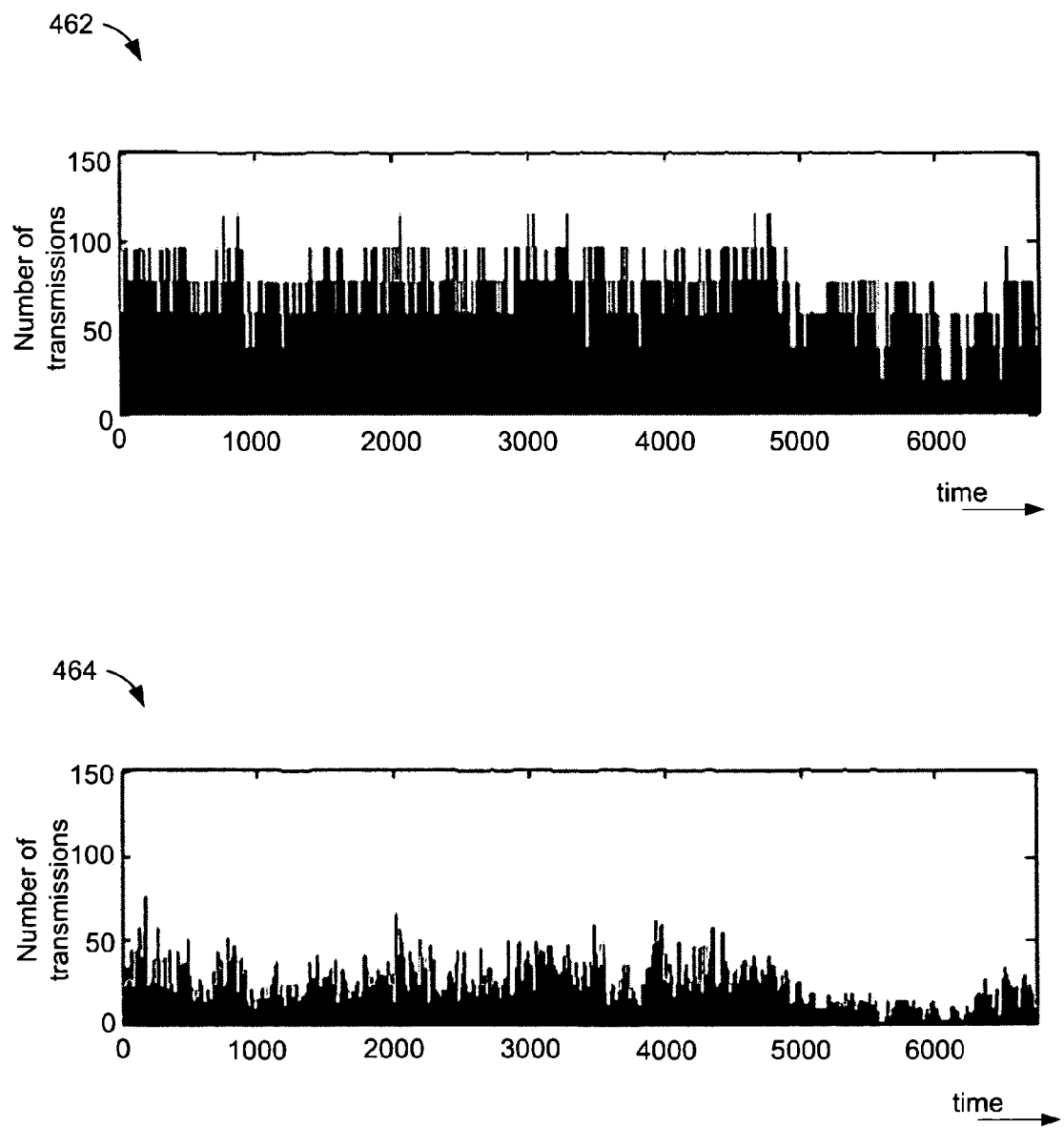
FIG. 15 graphically depicts the results of a simulation illustrating a number of transmissions without and with an embodiment of the present invention.

FIG. 15 graphically depicts the results of a simulation showing a number of transmissions without and with an embodiment of the present invention. In this simulation, a simulated sensor field with 20 nodes is used to illustrate the communication savings gained by organizing sensor nodes based on information. Sensor nodes are placed at random within an environment, and an event track is simulated and projected onto the image planes of the sensor nodes. In FIG. 15, graph 462 shows the number of transmissions without using an embodiment of the present invention and graph 464 shows the number of transmissions using an embodiment of the present invention. The transmission is the part of the share mode that shares features with other sensor nodes which are observing the same event. FIG. 15 shows an overall reduction in transmission almost immediately. The rate of reduction of transmissions is directly dependent on the thresholds set for determining if there is sufficient supporting evidence as well as the probability threshold for a sensor node to be considered as an information-based neighbor. While communication between sensor nodes is reduced, it is desirable that the same level of information propagation be maintained. In other words, it is desirable that the sensor nodes continue to receive the features of events that are shared with other sensor nodes.

Figure 16:
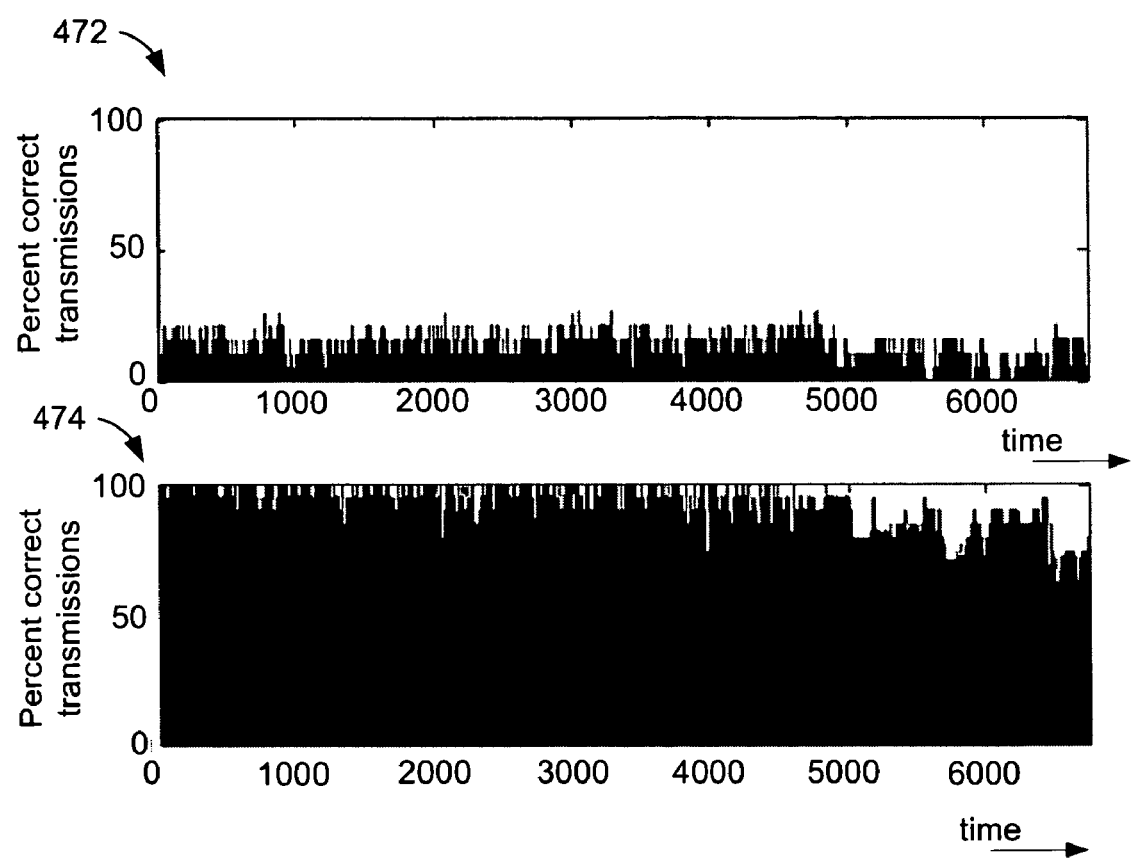
FIG. 16 graphically depicts the results of a simulation illustrating a percent of correct transmissions without and with an embodiment of the present invention.

FIG. 16 graphically depicts the results of a simulation illustrating a percent of correct transmissions without and with an embodiment of the present invention. In FIG. 16, the percent of correct transmissions without organization is shown in the upper graph 472 and with organization is shown in the bottom graph 474. The percent of correct transmissions is measured by calculating the percent of sensor nodes that receive the features of an event it is observing as well as not receiving features of events not being observed. Based on this measure, an embodiment of the present invention improves accuracy quickly, where most of the gain is reducing the case of receiving extraneous features of events not observed.

Figure 17:
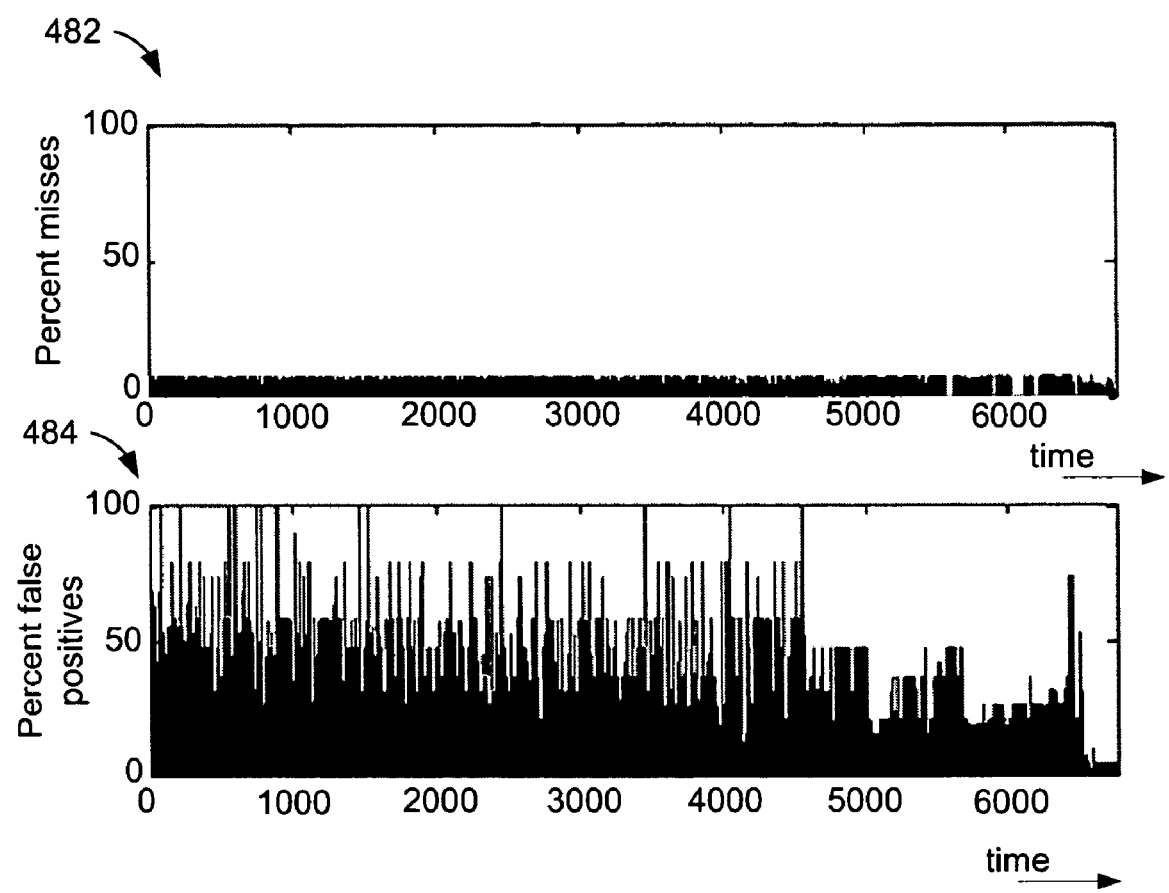
FIG. 17 graphically depicts the results of a simulation of an embodiment of the present invention illustrating percent misses and false positives.

FIG. 17 depicts the results of a simulation of an embodiment of the present invention illustrating percent misses and false positives. The upper graph 482 shows the percent misses using an embodiment of the present invention. The lower graph 484 shows the percent false positives using an embodiment of the present invention. Graph 472 shows a low percent misses, and graph 484 shows a gradual decline in false positives. Therefore various embodiments of the present invention advantageously provide a low percent misses and false positives along with a reduction in transmission. FIGS. 16 and 17 illustrate that, using an embodiment of the present invention, communication between sensor nodes is reduced while features continue to be shared among information neighbors.

Examples of Deployed Results

An embodiment of the present invention was tested against real data using Crossbow Stargate microprocessors and USB webcams. Data was captured both inside and outside at various times of the day and under different sensor emplacements, with inside data favored over outside data even though ultimate envisioned deployment would be outside due to the setup time constraints involved. The deployment consisted of sensor nodes arranged in a line monitoring a room with occlusions.

Event positions and direction of motion are determined as described above providing realistic examples of inherent sources of error. This configuration has multiple overlapping fields of view across the line of sensor nodes. The resulting probability tables of one sensor node i are illustrated for overlapping fields of view and prediction of motion. This sensor node i is located in the center position of the line of sensor nodes.

Figure 18:
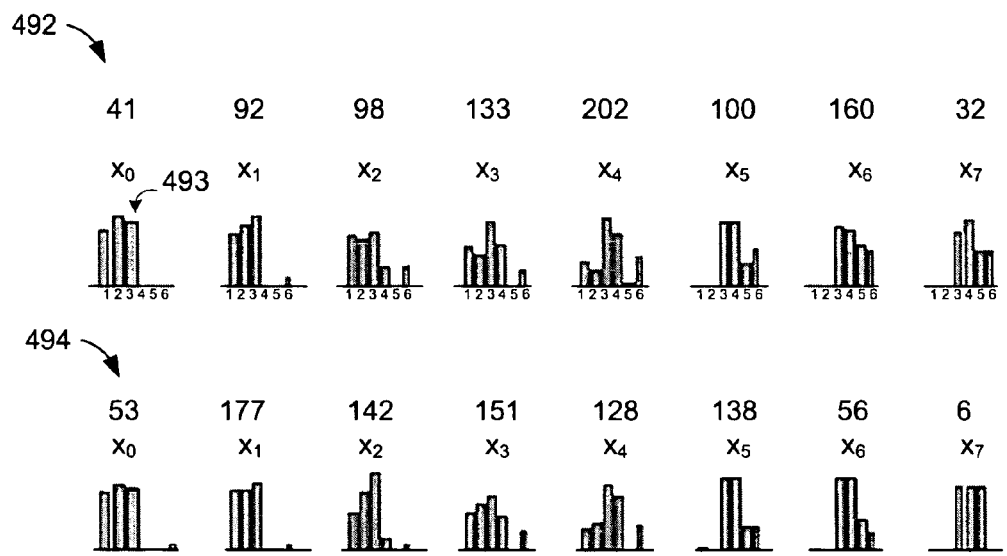
FIG. 18 illustrates concurrent detections, showing which sensor nodes have overlapping fields of view.

FIG. 18 illustrates concurrent detections, in which sensor nodes have overlapping fields of view. In this example, there are six sensor nodes j, labeled 1 through 6. Sensor nodes 1, 2 and 3 are to the left of sensor node i and sensor nodes 4, 5 and 6 are to the right of sensor node i. In addition, in this example, the field of view of each sensor node is segmented into eight vertical regions ($x_0$, $x_1$, $x_2$, $x_3$, $x_4$, $x_5$, $x_6$, $x_7$), rather than the five regions illustrated above in FIG. 14 in the simulated results. The number of detected events in the region x is shown above the bars associated with the region. Each bar chart illustrates the inferred information-based link probabilities for the associated region x. The bars of each chart represent the probability $P(j|i, x)$ for each neighboring sensor node, from left to right. For example, chart 493 illustrates the probability $P(j|i, x)$ of the sensor nodes for region $x_0$. In the first row 492 of charts, it can be seen that the field of view of the sensor nodes to the left overlap with left side of sensor node i's field of view and the field of view of the sensor nodes to the right overlap with the field of view of the right side of a sensor node i. The second row 494 of charts is another illustration of the probability $P(j|i, x)$ of the sensor nodes for the regions having different numbers of detections of events in the regions.

Figure 19:
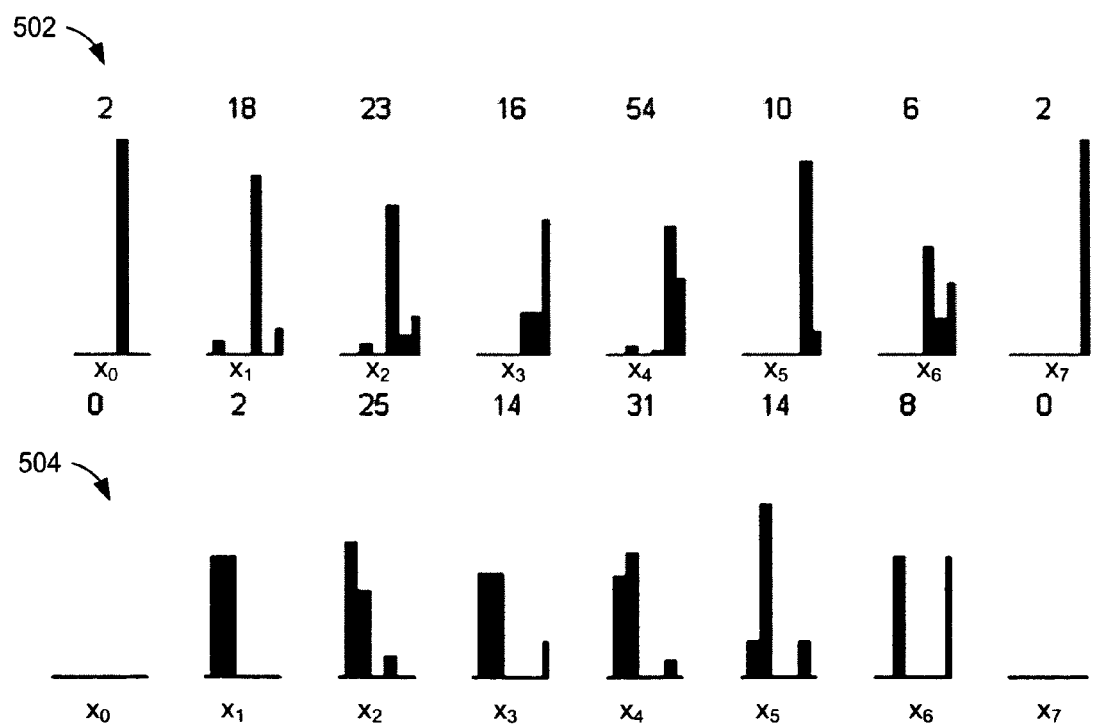
FIG. 19 illustrates the activation of exemplary sensor nodes after an event is detected at sensor node i in region x of the image.

FIG. 19 illustrates the activation of exemplary sensor nodes after an event is detected at sensor node i in region x of the image. In contrast to the charts shown in FIG. 18, the charts of FIG. 19 illustrate $P(j|i, x, dx, dz, t)$ where $t=1$. In FIG. 19, the image is divided into eight vertical regions ($x_0$, $x_1$, $x_2$, $x_3$, $x_4$, $x_5$, $x_6$, $x_7$) and each chart 503 is associated with a region x. Each bar of the charts is associated with a sensor node. In the set 502 of charts, the direction of motion of the events is from right to left and dx is equal to −1. In the set 504 of charts, the direction of motion of the events is from left to right and dx is equal to 1. As illustrated by the set 502 of charts, as events move to the left, the expected response is that sensor nodes to the left will detect the event in the near future. Likewise, as illustrated by the set 504 of charts, the same phenomenon occurs where movement to the right activates sensor nodes to the right.

A processor at a base station is typically able to perform computations at orders of magnitude faster than the deployed sensor nodes. Table 2 illustrates that even with a simple configuration of one sensor node and a base station, the cost of transferring data across the wireless link results in greater latency than processing the information at the sensor node. Adding more sensor nodes results in even greater delays while an embodiment of the present invention maintains approximately the same computational time at each sensor node.

TABLE 2

COMPARISON OF COMPUTATION TIME

| | Source | Radio | Sink |
|---|---|---|---|
| Centralized System | 0 | 1 second | 0 |
| Embodiment using information neighbors | .16 second | 0.2 second | N/A |

Although the processing for a centralized system is less than for an embodiment of the invention, the amount of time to transfer the data from the centralized system across the wireless link results in overall greater latency than the embodiment using information neighbors.

In general, various embodiments of the present invention can be used for large scale deployments of wireless sensor nodes which use a distributed problem solving approach to achieve quick response times. Various embodiments of the present invention address the limited power and processing speed by incorporating low-power image processing techniques to quickly reduce the large data acquired through images. Robustness is maintained through decision based fusion for event detection and data-based fusion for event extraction and tracking across the sensor field. Rather than organizing a set of sensor nodes based on radio connectivity, the sensor nodes are organized based on shared information. Organizing the sensor nodes based on shared information resulted in reducing communication cost without sacrificing the sharing of information of interest to neighboring sensor nodes. Distributed control is capable through the information-based neighbor lists, allowing the sensor nodes to alert one another of potential events and allow the transformation of the event's information across sensor nodes as the event traverses to the end user.

Embodiments of the present invention can be applied to national security and domestic security problems. Various embodiments of this invention may also be applied to perimeter or environmental monitoring. Some embodiments of this invention can be applied to home security systems.

Various embodiments of the software of the present invention may be implemented as an article of manufacture using standard programming and/or engineering techniques. The software may also be implemented as firmware or hardware, or any combination of software, firmware and hardware. The term "article of manufacture" (or alternatively, "computer program product") as used herein is intended to encompass a computer program accessible from any computer-readable device, carrier or media. In addition, the software of various modules of the sensor node may be accessible through a transmission medium, for example, from a server over a network. The article of manufacture in which the code is implemented also encompasses transmission media, such as wireless transmission media. Thus the article of manufacture also comprises the medium in which the code is embedded. Those skilled in the art will recognize that many modifications may be made to this configuration without departing from the scope of the present invention.

Various embodiments have been described with respect to wireless sensor nodes, however, the invention is not meant to be limited to wireless sensor nodes and may be implemented in wired sensor networks, or a sensor network having a combination of wired and wireless sensors. In other embodiments, the invention may be used with wireless sensor networks having stationary sensor nodes, movable sensor nodes which are stationary for a period of time during which various embodiments of the present invention may be performed, or a combination thereof. Various embodiments of the present invention support additions, removals and changes of sensor nodes.

Although various embodiments which incorporate the teachings of the present invention have been shown and described in detail herein, those skilled in the art can readily devise many other varied embodiments that still incorporate these teachings.

What is claimed is:

1. A method of operating a sensor node comprising: detecting, by said sensor node, a plurality of information-based events; determining, by said sensor node, whether at least one other sensor node is an information neighbor of said sensor node based on at least a portion of said plurality of information-based events, wherein said information neighbor has an overlapping field of view with said sensor node; and sending, by said sensor node, at least one communication to said at least one other sensor node that is an information neighbor of said sensor node in response to at least one information-based event of said plurality of information-based events.

2. The method of claim 1 further comprising: capturing a plurality of images at said sensor node; wherein said detecting said one or more information-based events is based on one or more respective images of said plurality of images.

3. The method of claim 1 further comprising: determining a heading of said at least one information-based event based on an first and second images that are captured by said sensor node, wherein said at least one communication comprises said heading.

4. The method of claim 1 further comprising: receiving a communication comprising at least one feature of another information-based event detected by a different sensor node; determining whether said sensor node detected, said another information-based event, based on said at least one received feature and at least one feature of one of said plurality of information-based events at said sensor node; and determining a position of said sensor node based on said at least one received feature and said at least one feature of said one of said plurality of information-based events at said sensor node.

5. The method of claim 1 wherein said determining comprises: counting said portion of said plurality of information-based events to provide a first value; counting said portion of said plurality of information-based events that match any information-based events detected by said one or more other sensor nodes to provide a second value; and wherein said sensor node determines that said at least one other sensor node is an information neighbor based on said first value and second value.

6. The method of claim 1 wherein said sensor node and said at least one other sensor node are wireless sensor nodes.

7. A sensor node comprising: at least one memory storing instructions executable by at least one processor, said at least one memory storing: one or more instructions that detect an information-based event based on an image; one or more instructions that determine whether at least one other sensor node is an information neighbor of said sensor node based on said information-based event, wherein said information neighbor has an overlapping field of view with said sensor node; and one or more instructions that send at least one communication to said at least one other sensor node that is an information neighbor of said sensor node in response to said information-based event.

8. The sensor node of claim 7 wherein said at least one memory stores: one or more instructions that receive a communication comprising at least one feature of another information-based event detected by a different sensor node; one or more instructions that determine whether said sensor node detected said another information-based event based on said at least one received feature and said one or more features identified by said sensor node; and one or more instructions that determine a position of said information-based event based on said at least one received feature and said one or more features identified by said sensor node.

9. The sensor node of claim 7 wherein said at least one memory stores: one or more instructions that receive a communication comprising at least one feature of another information-based event detected by a different sensor node; one or more instructions that determine whether said sensor node detected said another information-based event based on said at least one received feature and at least one feature of one of said plurality of information-based events at said sensor node; and one or more instructions that determine a position of said sensor node based on said at least one received feature and said at least one feature of said one of said plurality of information-based events at said sensor node.

10. The sensor node of claim 7 wherein said one or more instructions that determine comprise: one or more instructions that counts said information-based event to provide a first value; and one or more instructions that counts a number of times that said information-based event matches an information-based event detected by said at least one other sensor node to provide a second value; wherein said at least one other sensor node is determined to be said information neighbor of said sensor node based on said first value and second value.

11. The sensor node of claim 7 further comprising: an image sensor that captures said image; a shared memory that stores said image; and a radio that transmits said at least one communication.

12. The sensor node of claim 11 wherein said image sensor, said shared memory, and said radio are on separate modules, wherein said modules comprising said image sensor, said shared memory and said radio are activated independently.

13. The sensor node of claim 7 wherein said sensor node is a wireless sensor node.

* * * * *